US011612096B2

(12) United States Patent
Sivinski

(10) Patent No.: US 11,612,096 B2
(45) Date of Patent: Mar. 28, 2023

(54) TOOLBAR WITH HYDRAULIC HEIGHT CONTROL

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

(*) Notice: Subject to any disclaimer, the term of this patent is extended or adjusted under 35 U.S.C. 154(b) by 888 days.

(21) Appl. No.: 16/543,202

(22) Filed: Aug. 16, 2019

(65) Prior Publication Data

US 2020/0053944 A1 Feb. 20, 2020

Related U.S. Application Data

(60) Provisional application No. 62/765,072, filed on Aug. 17, 2018.

(51) Int. Cl.
*A01B 63/22* (2006.01)
*A01B 73/06* (2006.01)

(52) U.S. Cl.
CPC ............ *A01B 63/22* (2013.01); *A01B 73/065* (2013.01)

(58) Field of Classification Search
CPC ....... A01B 63/22; A01B 73/02; A01B 73/065; A01C 7/203; A01C 7/205; A01C 7/208
See application file for complete search history.

(56) References Cited

U.S. PATENT DOCUMENTS

| | | | | |
|---|---|---|---|---|
| RE45,303 E | * | 12/2014 | Henry | A01B 63/22 172/4 |
| 9,549,497 B2 | * | 1/2017 | Tuttle | A01B 73/044 |
| 9,832,921 B2 | * | 12/2017 | Anderson | A01B 73/04 |
| 9,999,171 B2 | * | 6/2018 | Magarity | A01B 63/002 |
| 10,045,474 B2 | * | 8/2018 | Bachman | A01B 63/114 |
| 10,405,480 B2 | * | 9/2019 | Blunier | A01B 76/00 |
| 10,412,877 B2 | * | 9/2019 | Barrick | A01B 63/22 |
| 2004/0016556 A1 | | 1/2004 | Barber | |

* cited by examiner

*Primary Examiner* — Gary S Hartmann
(74) *Attorney, Agent, or Firm* — McKee, Voorhees & Sease, PLC

(57) ABSTRACT

An agricultural toolbar has a center section and opposite wings which are horizontally foldable between transport and field positions. The toolbar has a hydraulic system which is very adaptable to many different hydraulically controlled features and options, without sacrificing the primary purpose of the system, which is accurately controlling the operating height of the toolbar, to achieve optimal planting depth of modern precision seed and fertilizer application systems.

20 Claims, 29 Drawing Sheets

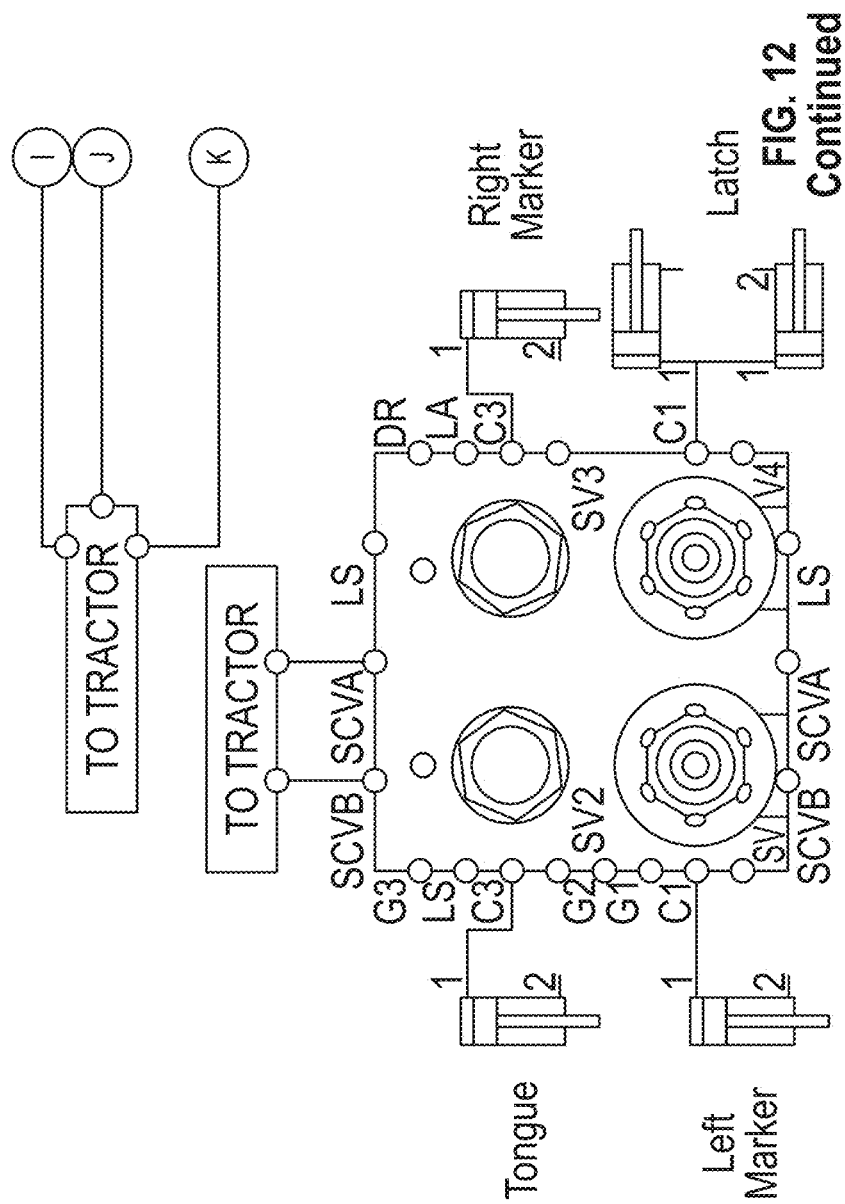

TOOLBAR WITH HYDRAULIC HEIGHT CONTROL

CROSS-REFERENCE TO RELATED APPLICATION

This application claims priority to provisional application U.S. Ser. No. 62/765,072, filed Aug. 17, 2018, the contents of which is herein incorporated by reference in its entirety.

FIELD OF THE INVENTION

The present invention relates generally to agricultural implements. More particularly, but not exclusively, the invention relates to an agricultural toolbar with hydraulic height control.

BACKGROUND OF THE INVENTION

An agricultural toolbar is an implement fixed to a hitch assembly for towing behind a tractor. A variety of row units may be mounted to the toolbar. The row units include tools, such as planters, sprayers, discs, and the like for working on the ground or crops. Commonly the tool bars will have multiple sections. The position of the tool bar sections relative to the ground and to each other significantly affects how affective the tools can perform their intended jobs.

Therefore, there is a need in the art for an agricultural tool bar with improved control of the positioning of the toolbar sections.

Many planter and tillage toolbars frames on the market today utilize a Master/Slave rephasing hydraulic system, to raise and lower the toolbar frames or sections. Master/slave rephase hydraulic systems utilize oil from the rod end of the master cylinder to supply lift oil to the base end of the slave cylinder system. While this system is widely used, it has many drawbacks, such as uneven raise and lower functions when the toolbar frame cylinders get out of "phase", reduced efficiency of the hydraulic system, increased hydraulic oil heat, increased risk of pressure intensification causing cylinder failure, and heat induced hydraulic component failures.

When a planter frame raises and lowers unevenly, it can cause the planter row units to operate at different levels in the soil or can cause the row units to engage the ground unevenly which causes side loading on the row unit which can cause excessive wear to linkage arms, opening discs, and closing wheels. Tillage toolbar frames (such as striptill) can encounter these same issues.

Additionally, master/slave rephase hydraulic systems require different size hydraulic cylinders, based on volumetric values of the hydraulic cylinder rod and base oil capacities, to be used across the width of the toolbar. Master/Slave cylinder systems require dedicated and specific hydraulic supply hose routing, to maintain the proper flow of oil to the next hydraulic cylinder used in the series.

When a master/slave hydraulic system gets out of "phase" (meaning not all the cylinders on the planter or tillage frame are extending or retracting to the same position), the frame must be either fully raised or fully lowered and maintained at that position to force oil around the hydraulic cylinder piston, through a very small rephasing port in the hydraulic cylinder, to all cylinders so as to force the all the cylinder pistons to the same position.

SUMMARY OF THE INVENTION

The new hydraulic system of the present disclosure eliminates the use of master/slave rephase hydraulic cylinders and replaces these cylinders with non-rephase cylinders and a hydraulic system that uses a position sensor on the toolbar frame wheels.

The hydraulic system also utilizes a common rail or common main tube hydraulic system that supplies oil to all the hydraulic components on the toolbar frame. This system utilizes hydraulic cylinders that are non-rephasing utilized throughout the toolbar frame, thus eliminating the dedicated hydraulic system routing. This also allows for the flexibility of adding additional wheels or hydraulic components to the toolbar frame such as rear drawbars for towing fertilizer or seed nurse tanks, without having to redesign the complete hydraulic circuit.

A computer console mounted in the tractor cab controls the oil flow supply to the hydraulic cylinders, via hydraulic valves and data received from the position sensor mounted to a wheel unit pivot pin. This system maintains a uniform planting or tilling depth of the components mounted to the toolbar frame. Since precise placement of seed and fertilizer is paramount in the high-speed planting and tilling agricultural environment, keeping these components at the appropriate depth or operating position overcomes the challenges of prior art master/slave hydraulic systems.

Features of the hydraulic system allow the toolbar to maintain even and consistent raise/lower functions controlled by the computer console, along with the ability of the planter operator to bias any section of the toolbar up or down manually to accommodate differing soil conditions or planting or tilling preferences. This function is accomplished via a screen selection key button and rotary adjustment knob on the computer console. This manual control can optionally be replaced by either a physical position measuring tool, such as floating ground engaging wheel, ultrasonic measuring or radar driven measuring systems, to automatically adjust the toolbar frame raise/lower hydraulic cylinders to maintain the desired toolbar height distance from the soil surface.

The hydraulic system also has the ability to read vacuum pressure needed for proper seed delivery and direct oil to the vacuum fans to maintain the desired vacuum pressure needed for high speed, highly precise planting components utilized on modern planters.

The hydraulic system also allows for the operator to either manually adjust or automatically set the desired raise height at end-of-row turns to minimize tractor hydraulic oil consumption during raise/lower functions of end turns. Highly precise planting components such as hydraulic row unit down force systems, vacuum fans, seed delivery fans and alternators for supplying electricity to electrically driven seed meters, pumps, fertilizer and insecticide delivery systems, demand greater amounts of hydraulic oil for proper operation, drawing oil away from the tractor, for toolbar functions. This totally computer-controlled toolbar hydraulic system allows the computer to control and prioritize how much oil is used during critical functions of the planting operation, thus allowing for controlled raise height of the planter or tillage frame, to allow the ground engaging units to clear the soil surface, during end turns without demanding more hydraulic oil from the tractor than necessary.

The hydraulic system is more efficient, allows for less oil consumption to power hydraulic components, reduces heat in the system and reduces wear of frame lifting components.

This hydraulic system has the ability to incorporate several imbedded scale options, including a hydraulic scale option that utilizes wheel position and hydraulic pressure feedback to determine payload weight, and a load bar scale to determine payload weight.

The invention may also include scale feature options. These options allow the automation system to monitor the bar and commodity weights, and since it is directly integrated into the automation system, this feedback will directly influence the operator through the primary and remote human machine interfaces (HMIs), as well as the automated controls to indicate rates, levels, and control the automation of a refill sequence.

The invention may also include a wing down pressure, ballast/auto ballast control that has the ability to allow the operator to apply downforce to the wing assemblies either manually or automatically where by wheels, actuators, and ground position and force feedback is used to control the re-distribution of the bar weight from the HMI.

The invention may also include an automated drawbar that has the ability to automatically control the drawbar position so that it can synchronously travel with the bar during the raise/lower sequence in order to maintain a consistent position relative to the bar position. This feature allows the operator to adjust the travel range to meet the desired position limits from the HMI.

This invention may also include a CSD power system that has the ability to provide and control excess flow that is not being utilized by the CDS circuit to allow the operator to power an ancillary piece of equipment such as a fertilizer pump. The operator can either control the flow with either a manual flow control at the manifold or be able to electronically control it through the HMI.

The invention may also include an auto pack/un-pack feature that permits automatic adjustment of the tool bar back and forth between a work position and a travel position upon touch of single control when the system is in a road mode.

The invention may also include an auto height control that has the ability for the operator to manually and automatically control the height of the bar in relation to the ground.

The invention may further include a parallel arm feedback control that has the ability to read the position of the parallel arms in relation to the bar and manually or automatically make adjustments to them by means of the bar height.

The disclosure also relates to a case drain pressure feedback feature that has the ability to monitor the case drain pressure and alert the operator if it is out of the normal range.

The disclosure also relates to an implement up output system that has a minimum of two outputs that will turn ON when the bar reaches the Implement-Down set position during a bar lower operation and will turn OFF when the bar reaches the Implement-Up position during a bar lift operation. The Imp-Up setting is adjustable by the operator. One output is at the back of the bar and can be used to turn ON/OFF an ancillary device such as a fertilizer pump, or it can be used to signal a precision agricultural system that the bar is lowered, activating planting or fertilizer systems without that addition of limit switches. There is also an output from the HMI that can be used for signaling an input of an ancillary devices such as a fertilizer pump controller so there is no need to route another cable out of the tractor to a physical limit switch.

DETAILED DESCRIPTION OF PREFERRED EMBODIMENTS

Figure 1:
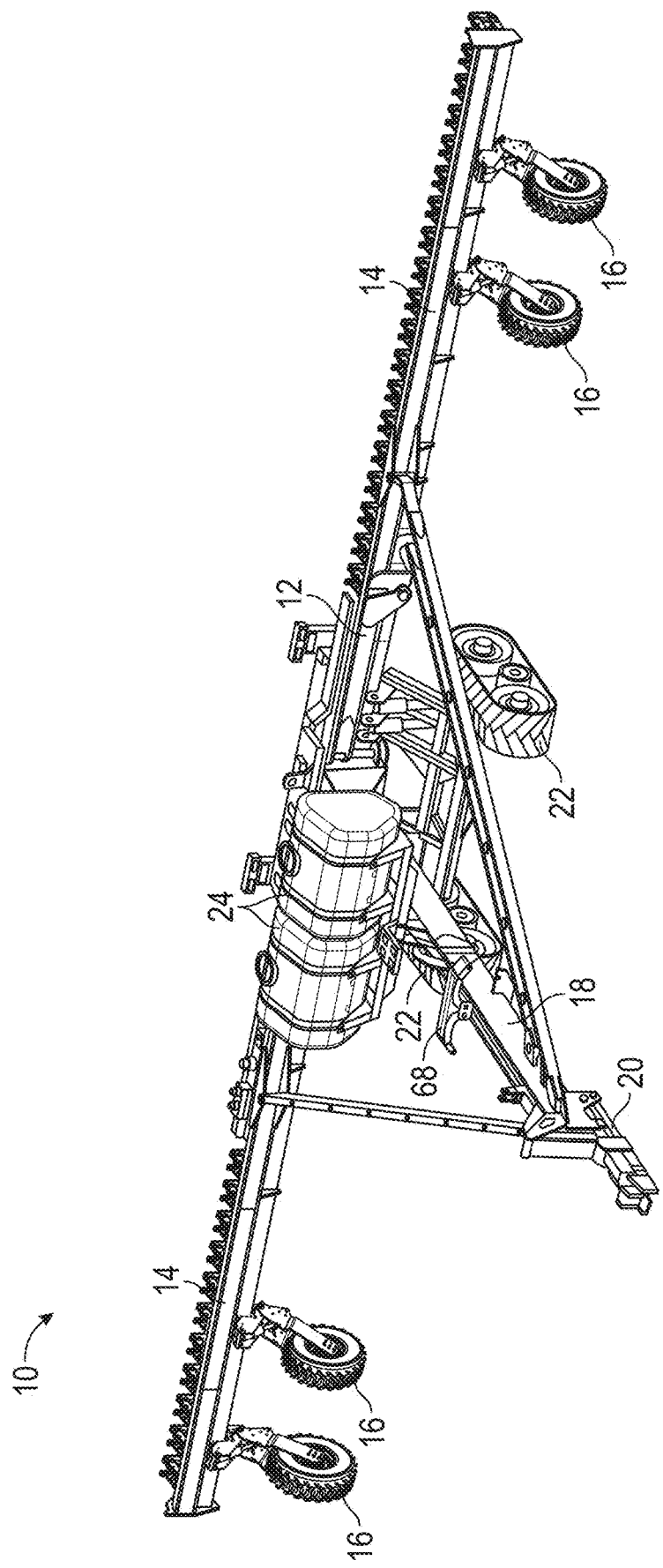
FIG. 1 is a perspective view of a tool bar having the hydraulic height control system, according to the present invention.
Figure 2:
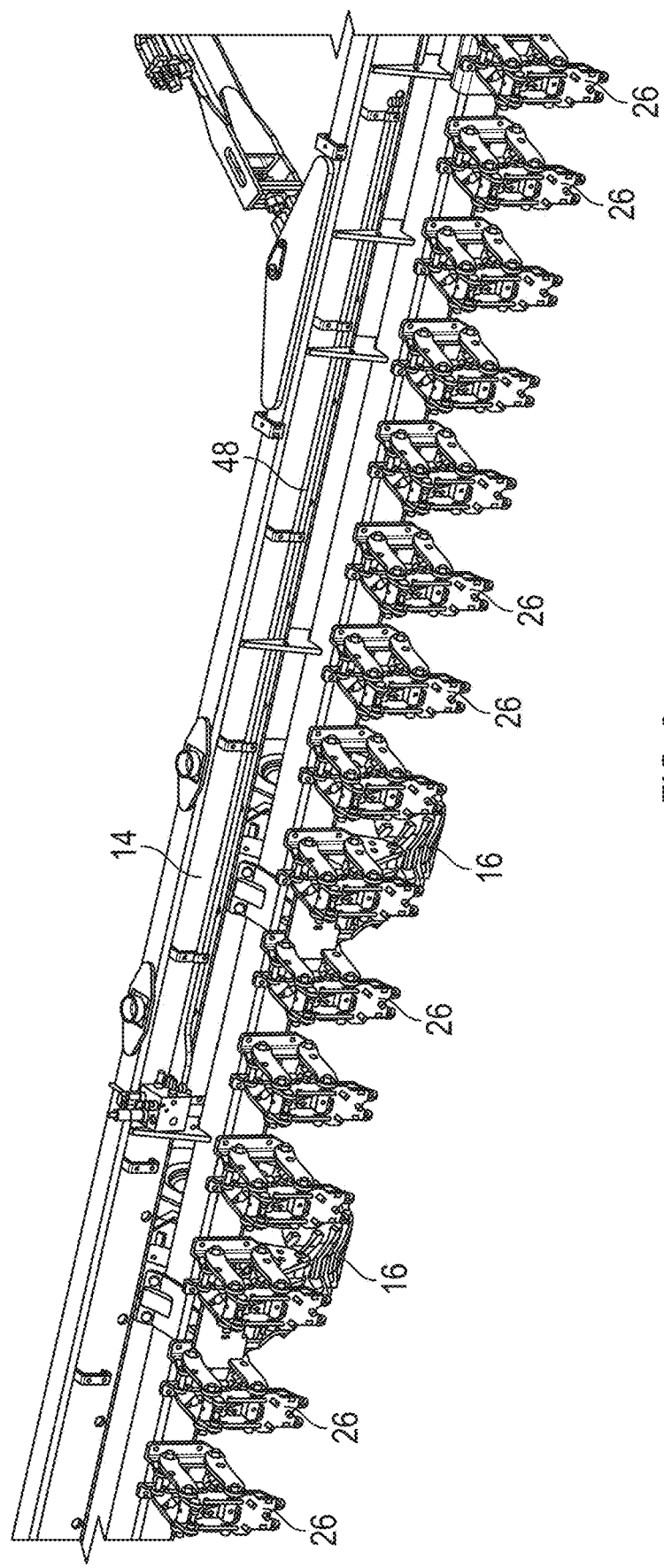
FIG. 2 is an enlarged view of a section of the left wing assembly of the tool bar shown in FIG. 1, from the rear of the tool bar (and without hydraulic hoses, for clarity).
Figure 3:
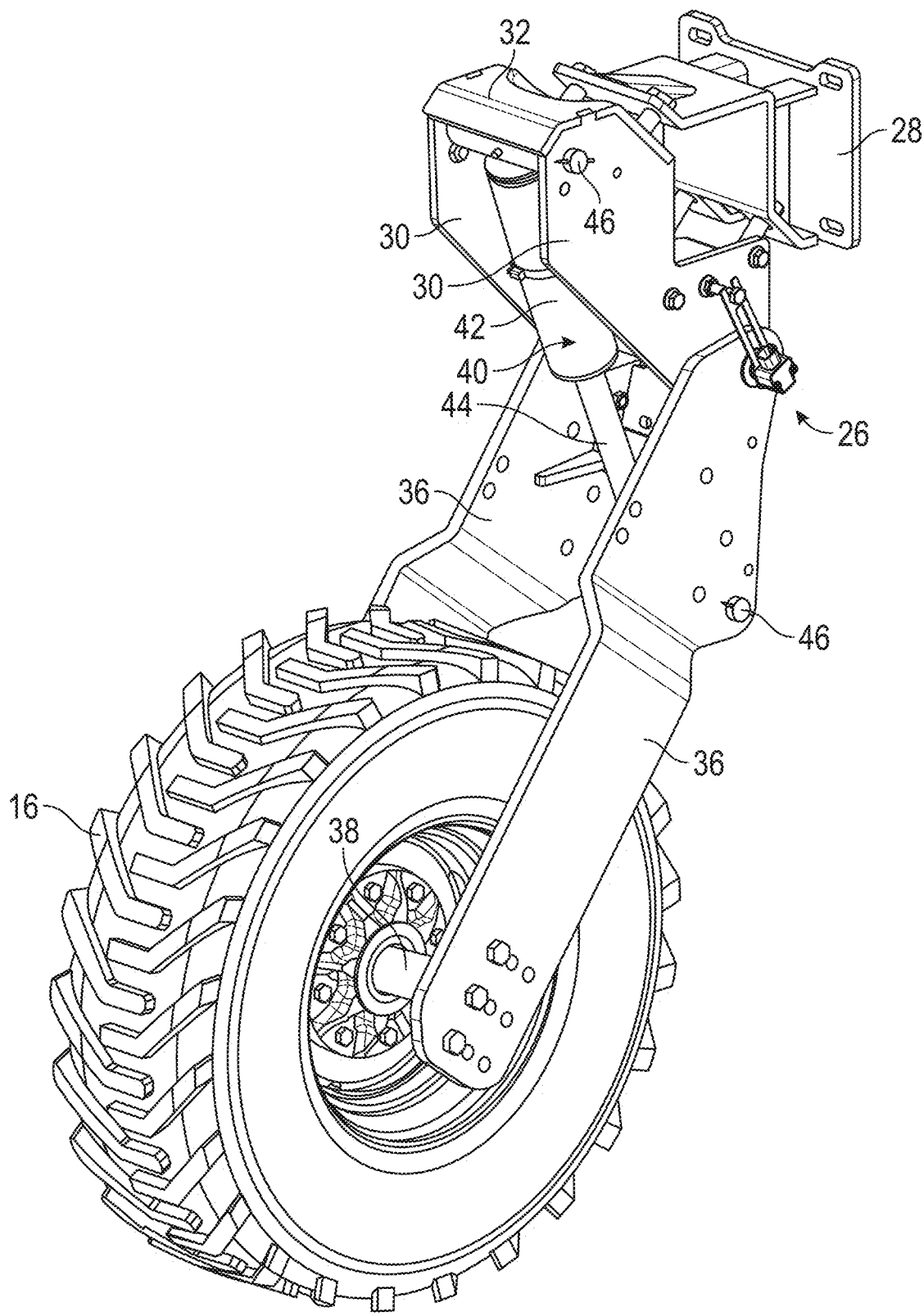
FIG. 3 is a perspective view of one of the tool bar wheel and mounting bracket assembly shown in FIG. 1, with the sensor cover removed for clarity

The hydraulic height adjustment system of the present convention is intended for use on an agricultural tool bar 10, as shown in FIG. 1. The toolbar includes a center section 12, and opposite left and right wings 14. The wings 14 are supported by wheels 16. The toolbar 10 includes a frame 18 with a tongue 20 adapted to be connected to the three-point hitch system of a tractor. The frame 18 is supported by wheels or tracks 22. The toolbar 10 is intended to support hoppers or tanks 24, as well as other various tools and attachments, such as planters, other tillage tools and sprayers.

Each of the wheels 16 are mounted to the wings 14 with a bracket assembly 26. The back assembly 26 includes a base plate assembly 28 bolted or otherwise secured to the wings 14. The bracket assembly 26 further includes a pair of plates 30 with an interconnecting web 32 which is rigidly secured to the base plate assembly 28 by bolts 34. A pair of spaced apart arms 36 are pivotally mounted to the plates 30 by pivot pins 52. A single, elongated pin 52 can be provided to extend through both plates 30 and arms 36 of the bracket assembly 26, or separate pivot pins 52 can be provided for each side of the bracket assembly 26. The arms 36 support an axle 38 for the wheel 16.

A hydraulic cylinder 40 is mounted between the plates 30 and the arms 36 of each wheel bracket assembly 30. The hydraulic cylinder 40 has a body 42 and an extendable/retractable arm 44. The hydraulic cylinder body 42 is operatively connected to hydraulic fluid lines (not shown) to allow the arm 44 to extend and retract. The fluid lines for the hydraulic cylinders 40 utilize a common rail or tube 48, as further described below.

Figure 6:
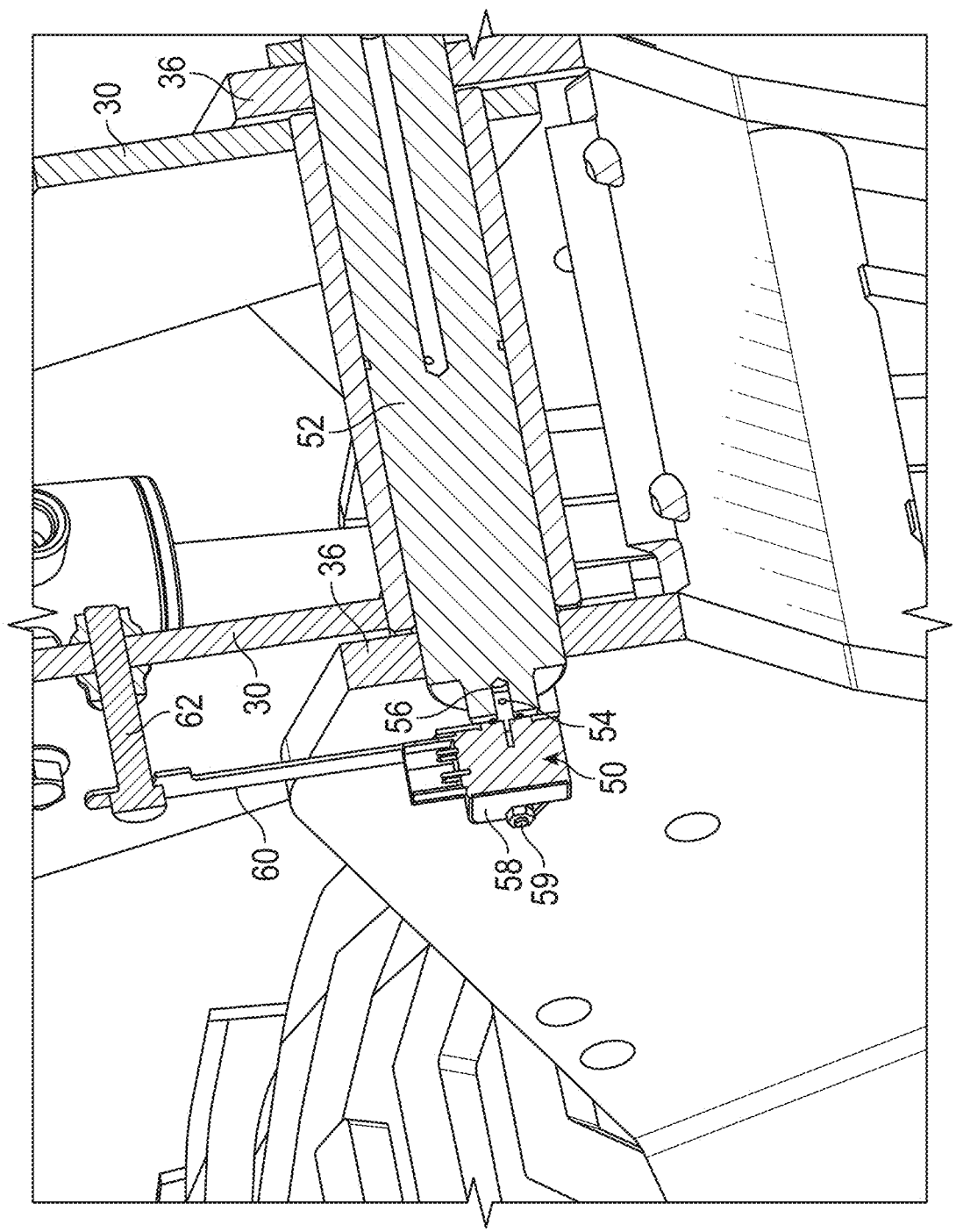
FIG. 6 is a sectional view of a portion of the wheel mounting bracket, showing the wheel position sensor mounted on the wheel unit pivot pin (but with the set screw removed for clarity).
Figure 7:
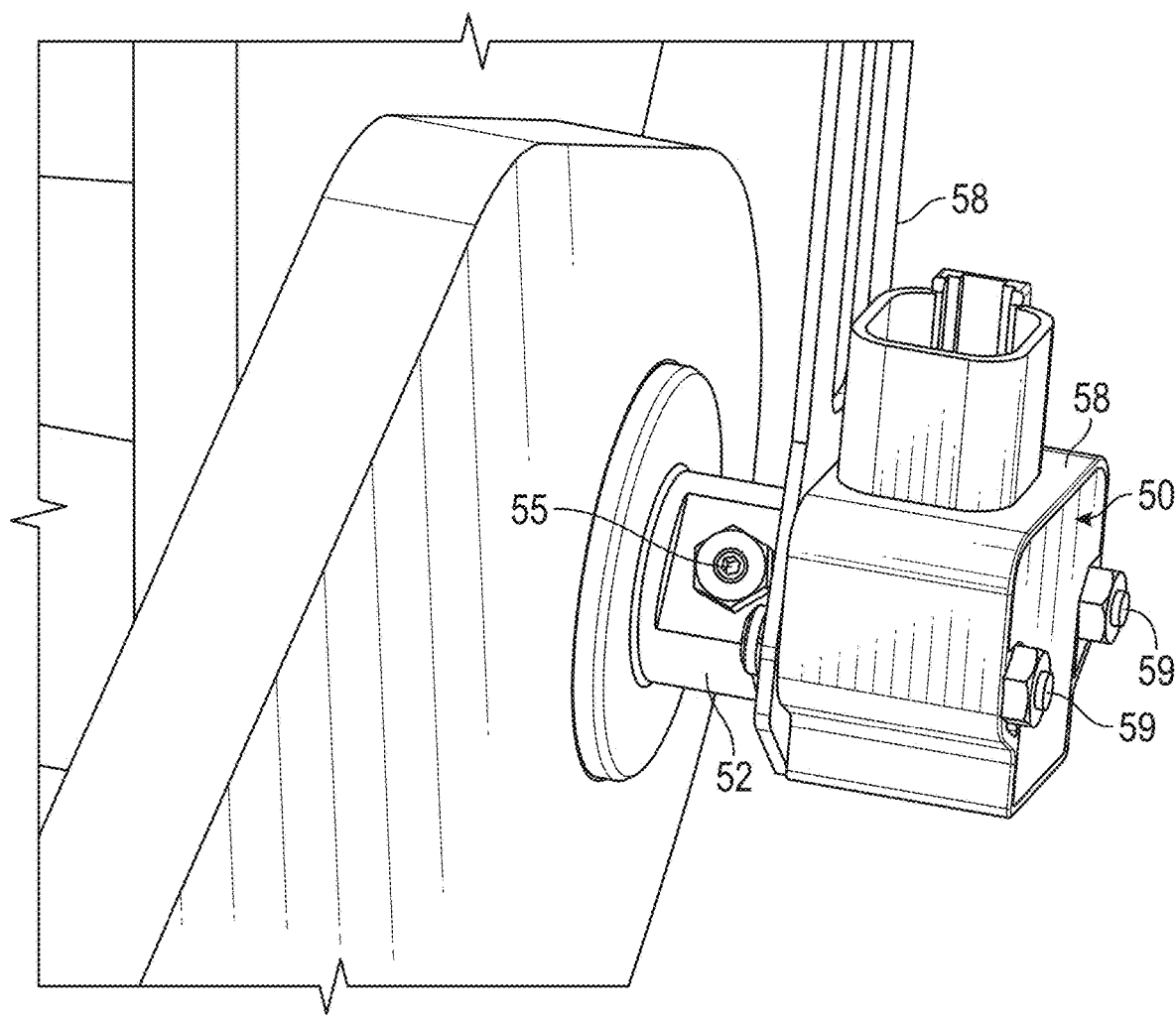
FIG. 7 is an enlarged view showing the position sensor mounted to the fixed and to the wheel unit pivot pin for the hydraulic height control system of the present invention.
Figure 8:
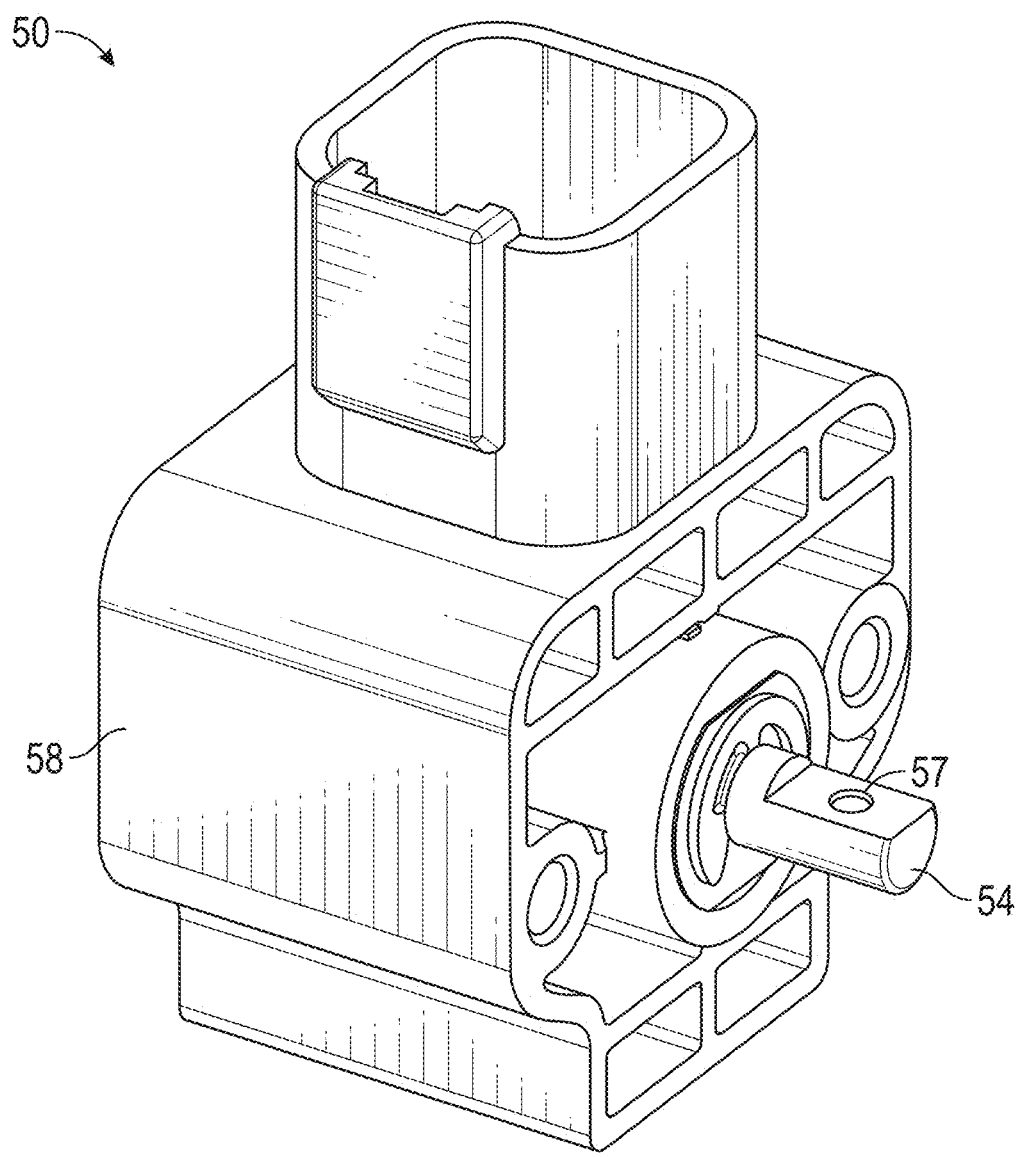
FIG. 8 is a perspective view showing the position sensor rotary shaft, according to the present invention.

A wheel position sensor 50 is provided on each wheel bracket assembly 26. The sensor 50 is mounted on the pivot pin 52 extending through the plate 30 and arm 36, as best seen in FIG. 6. The sensor 50 includes a rotary shaft 54 extending into an axial hole 56 in the pin 52 and fixed by a set screw and bolt assembly 55 (FIG. 7). The shaft 54 includes a hole or recess 57 (FIG. 8) to receive the end of the set screw 55.

Figure 4:
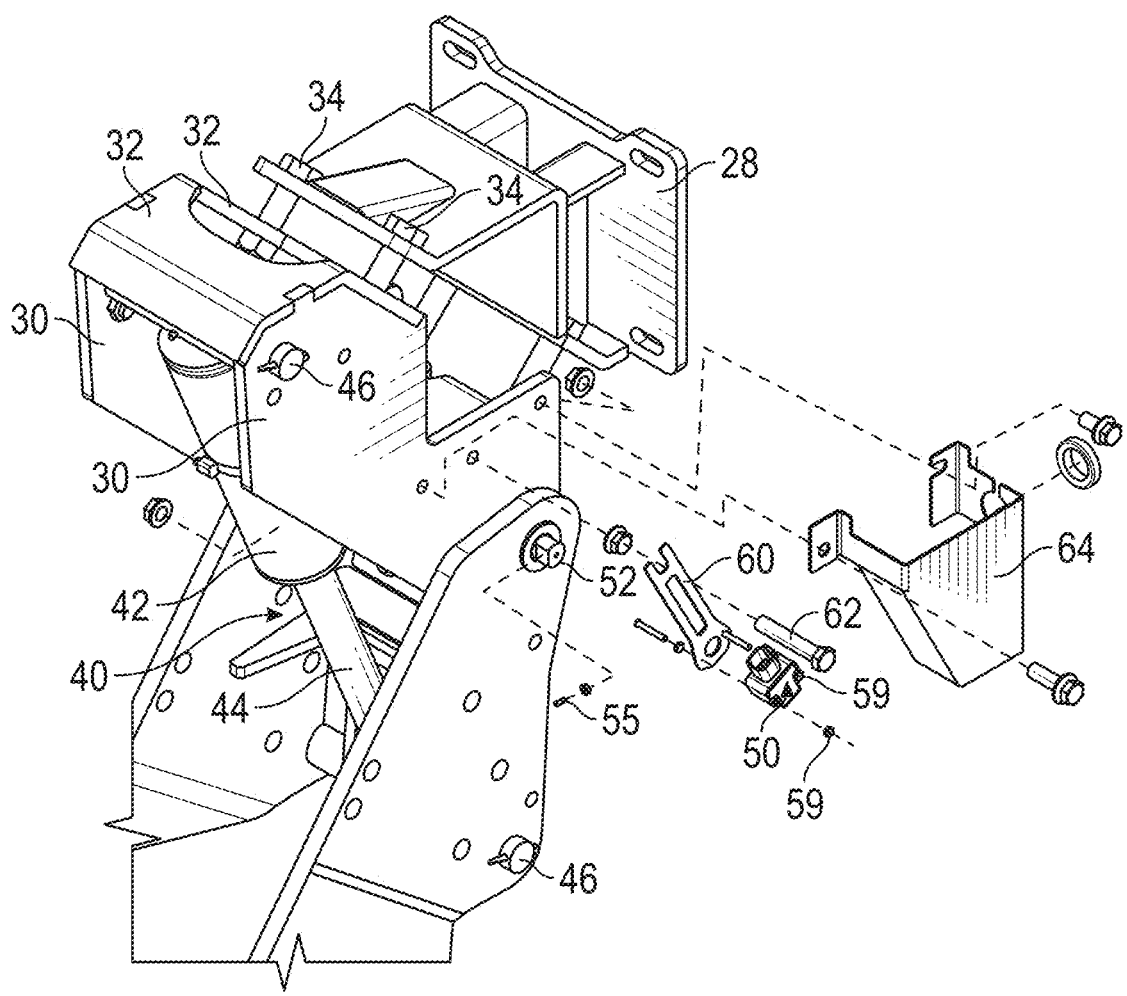
FIG. 4 is an exploded view of the wheel mounting bracket from FIG. 3, with the sensor cover.
Figure 5:
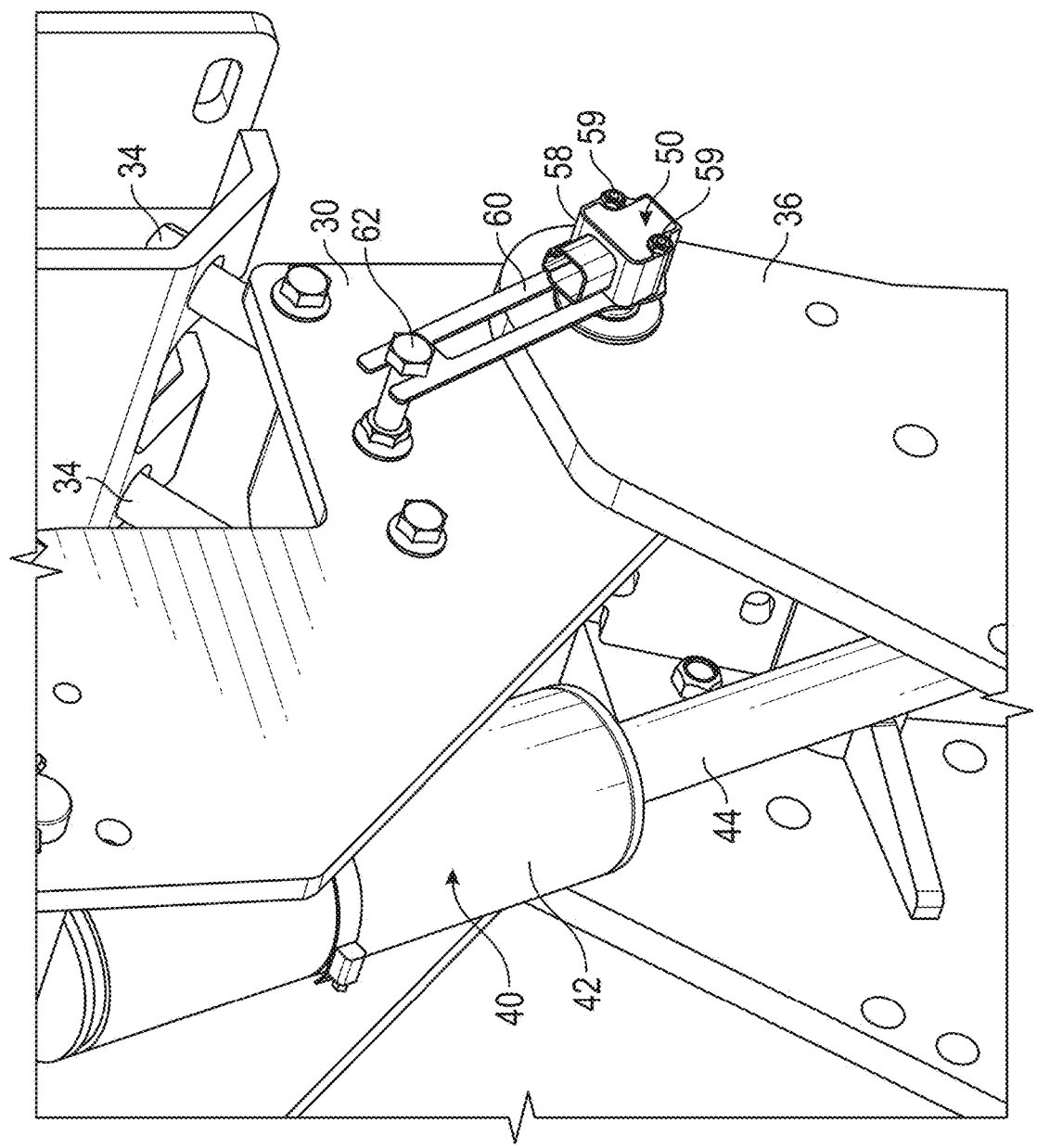
FIG. 5 is an enlarged view of the wheel mounting bracket position sensor, according to the present invention.

The sensor 50 has a body 58 fixed to an arm 60 by screws or bolts 59. The upper end of the arm 60 receives a bolt 62 extending into the plate 30. A cover 64 (FIG. 4) can be bolted to the plate 30 so as to enclose the sensor 50.

When the hydraulic cylinder 40 is actuated to extend or retract the arm 44, thereby raising or lowering the wheels 16 via the bracket arms 36, the wheel bracket arms 36 rotate the pivot pin 52 and the sensor shaft 54. Rotation of the shaft 54 generates a signal by the sensor 50 transmitted to a computer or microprocessor in the tractor cab (not shown) so that the operator can monitor and adjust the raised and lowered position of the wheels 16, as described in further detail below.

Figure 9:
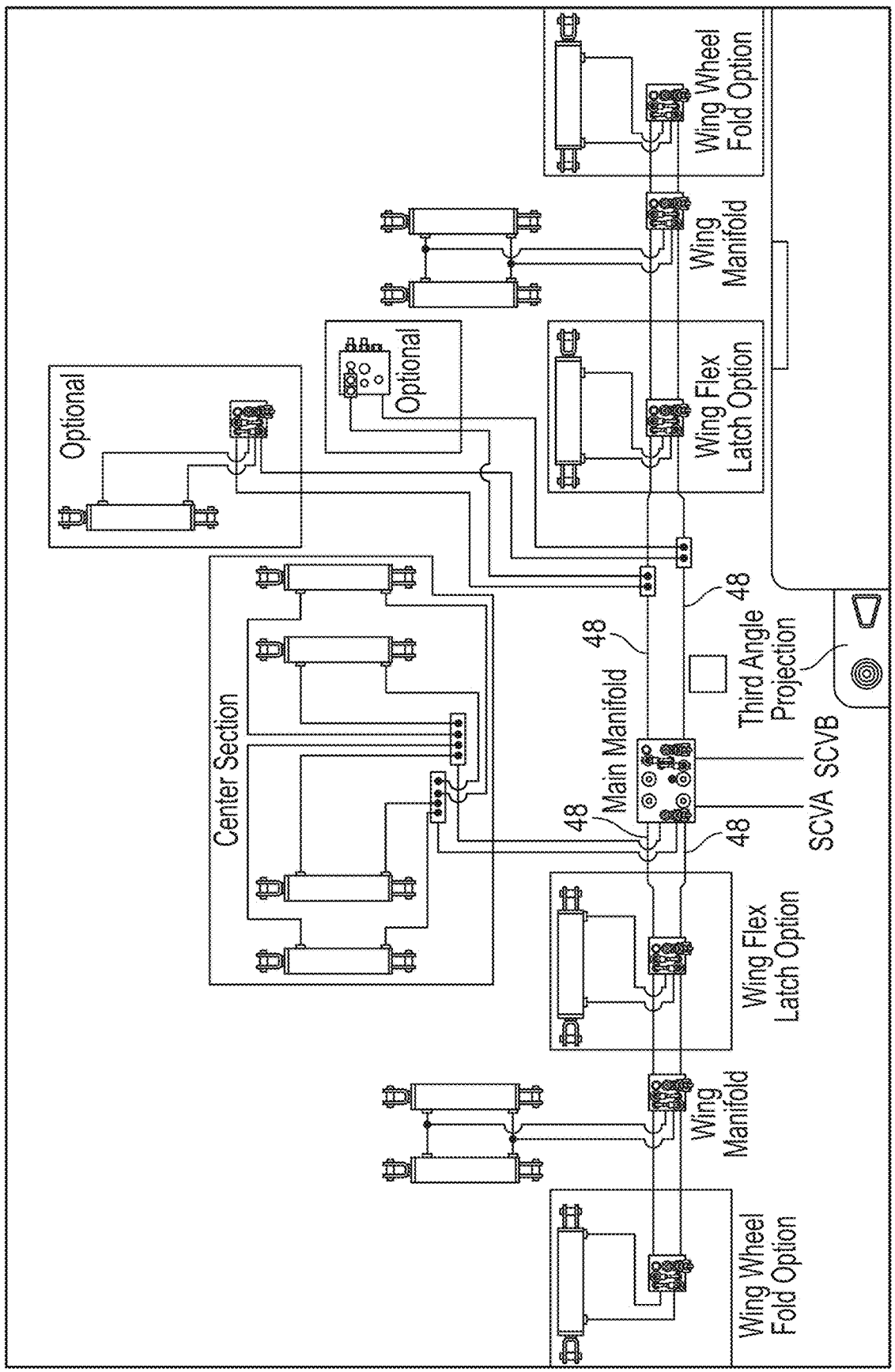
FIG. 9 is a hydraulic schematic of the hydraulic height control system according to the present invention.
Figure 10:
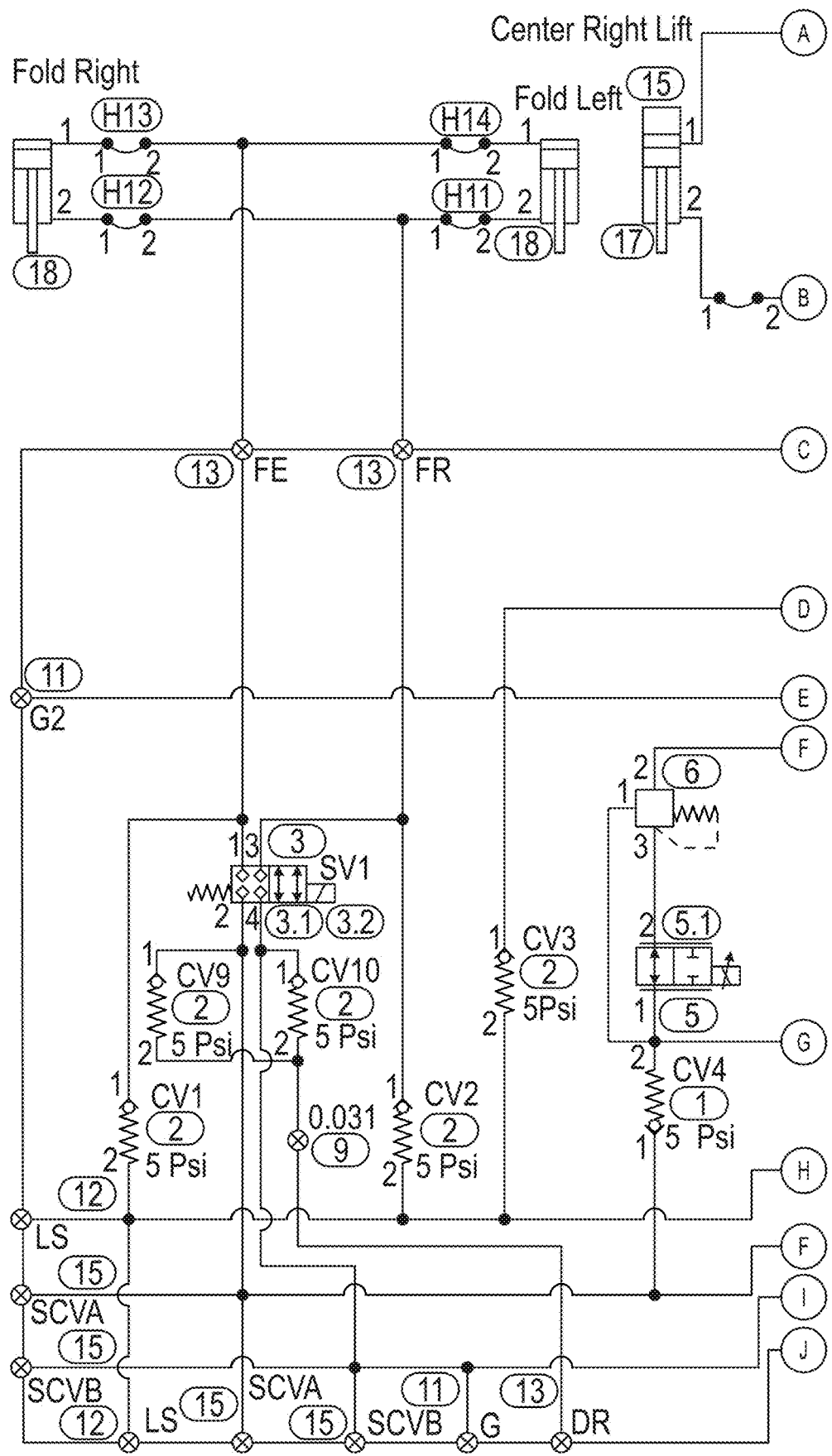
FIG. 10 is another hydraulic schematic for the hydraulic height control system of the present invention.
Figure 10:
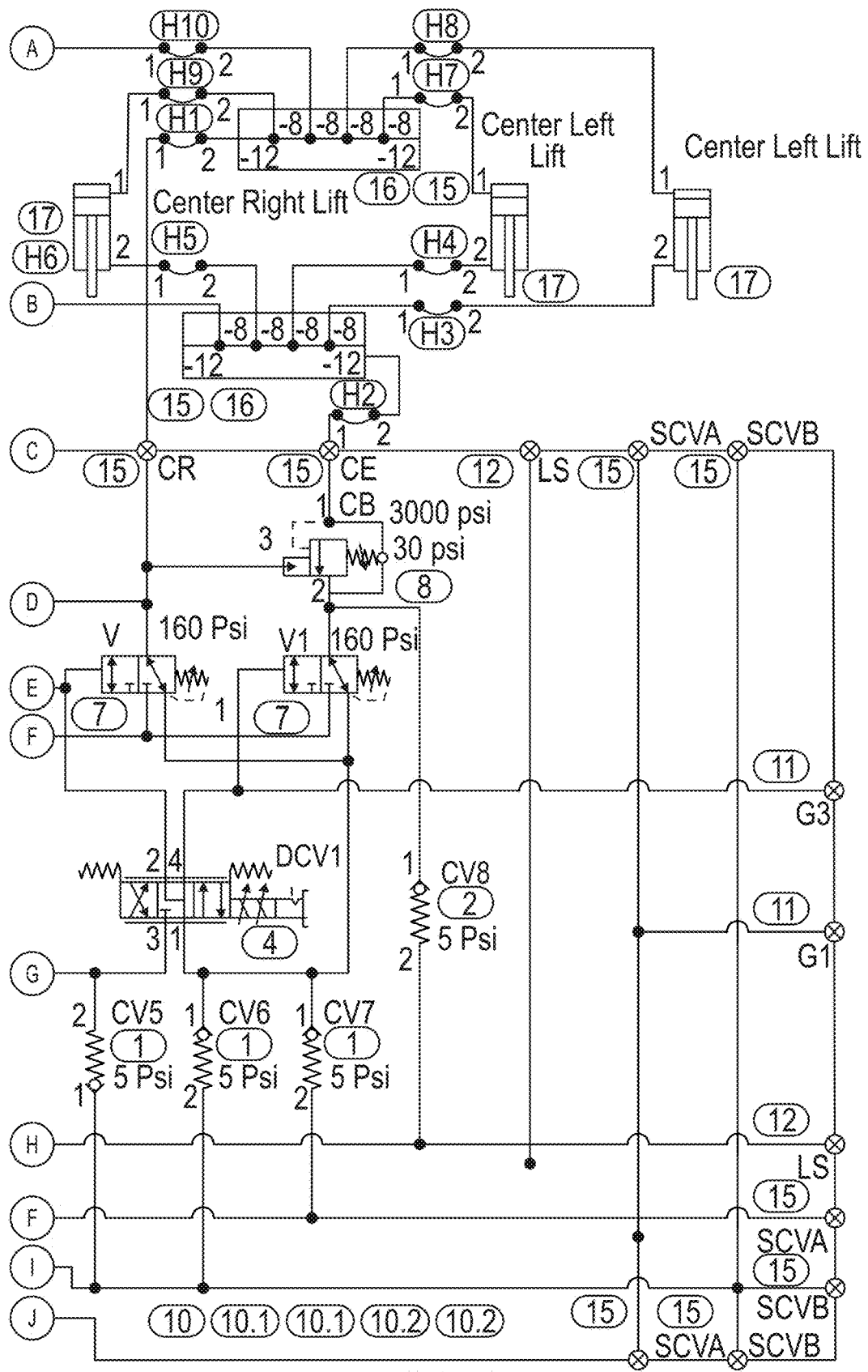

FIGS. 9 and 10 are schematics which depict the layout of the complete hydraulic system, according to the invention, as well as valve type and oil flow schematic.

A key feature of the hydraulic system is the ability to maintain accurate operating height of the toolbar while operating in the planting mode. To achieve proper operating height and to control other "optional" components, such as oil driven fans, frame down force systems and rear mounted pull drawbars, the computer must be able to determine the flow direction of oil from the tractor, through the hydraulic system, at all times, especially during raise/lower functions. This "bleed off" oil is then returned to the tractor via a hydraulic route labeled "DR" for drain.

To achieve flow direction information to the toolbar control console computer, oil passes through the main valve block assembly via galleys that have small "bleed off ports" or oil galleys that allow a pressure sensor to determine the direction of oil flow by building hydraulic oil pressure in either SCV A or SCV B ports. These pressure sensors also determine pressure of the oil being "supplied" to the toolbar hydraulic system from the tractor. The computer can then use this information to make changes to wing downforce and other optional toolbar functions, based on hydraulic system pressure from the tractor. Another function of the main toolbar valve block is to supply and control oil to the toolbar center section lift tires or tracks, based on position sensing information from the wheel unit position sensor. The main valve block also supplies oil to wing wheel control manifolds, central seed deliver fans, and folding row unit stepbacks.

To maintain proper toolbar operating height from the soil, hydraulic flow from the tractor must be maintained at all times. The wheel position sensor mounted on wing and center section wheels 16, will feed wheel position information to the toolbar console computer. The computer will then command oil flow from the tractor (if needed) to extend or retract the wing wheel cylinders 40 to either raise or lower the toolbar wheels 16, all independently from one another, based on the desired toolbar height, set by the operator. To accomplish the independent control of the individual toolbar lift wheels, oil is supplied to valve blocks mounted near the wing wheels 16, from the main manifold.

Counterbalance and proportional valves are used by the wheel position control valves, to control the velocity that the wheel moves up and down, to ensure that the toolbar 10 will raise and lower level during field head land turns. Raise and lower velocity of the complete toolbar 10 can also be controlled via information from the wheel position sensors 50, by the console computer and the tractor operator. This feature ensures that the toolbar operates up and down at optimum speed based on toolbar load (determined by main manifold pressure sensors discussed earlier) and available tractor hydraulic oil pressure and flow.

Wing Wheel Control Manifold

Figure 11:
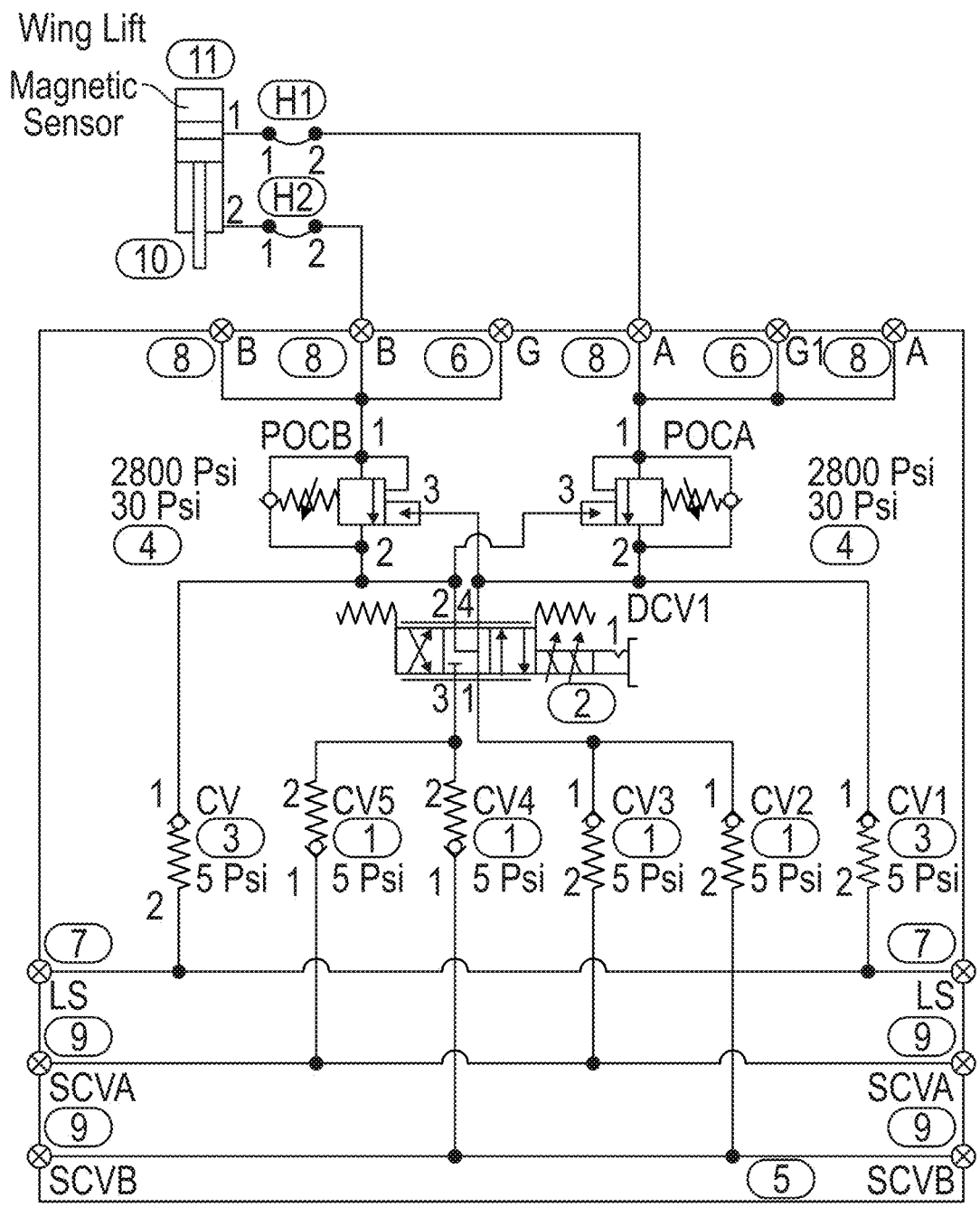
FIG. 11 is another hydraulic schematic for the hydraulic height control system of the present invention.

FIG. 11 is a hydraulic schematic depicting the wing wheel control valve layout and hydraulic flow routing to the wing lift/lower hydraulic cylinder 40. Depending on the toolbar configuration, there could be as many as (8) wing wheel control manifolds on a toolbar. As mentioned in previous paragraphs, these manifolds control the flow of oil each of the toolbar wheel assemblies to maintain the correct toolbar operating height. Because of changing conditions constant oil supply is required from the main toolbar manifold, from the tractor, to make height adjustments on the fly, to maintain proper toolbar running height. Raise/lower toolbar velocity can also be controlled with the wing wheel control valve and the console computer.

Hydraulic Control of Options (-1 & -2)

Figure 12:
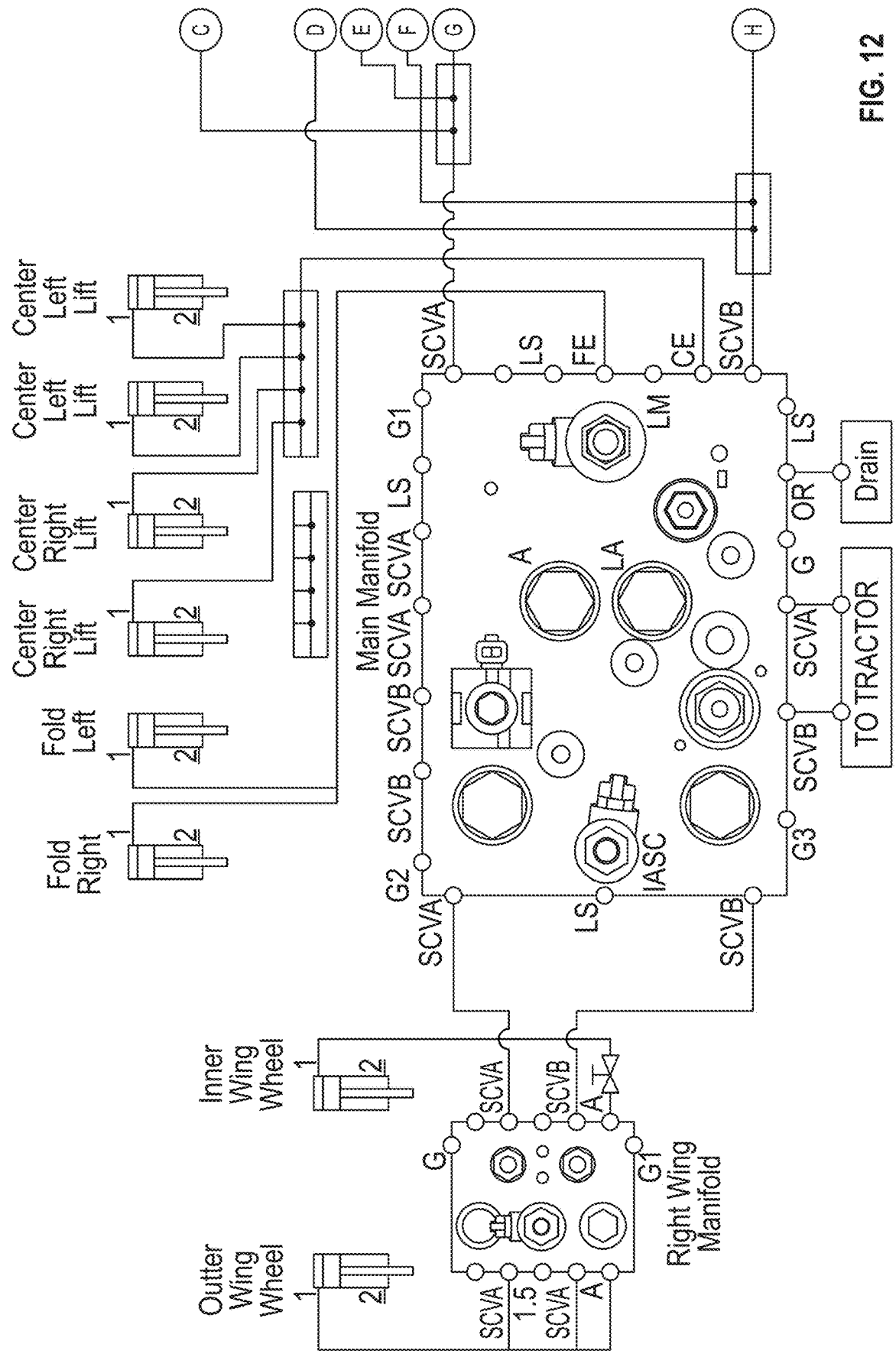
FIG. 12 is a hydraulic valve schematic for the toolbar height control system of the present invention.
Figure 12:
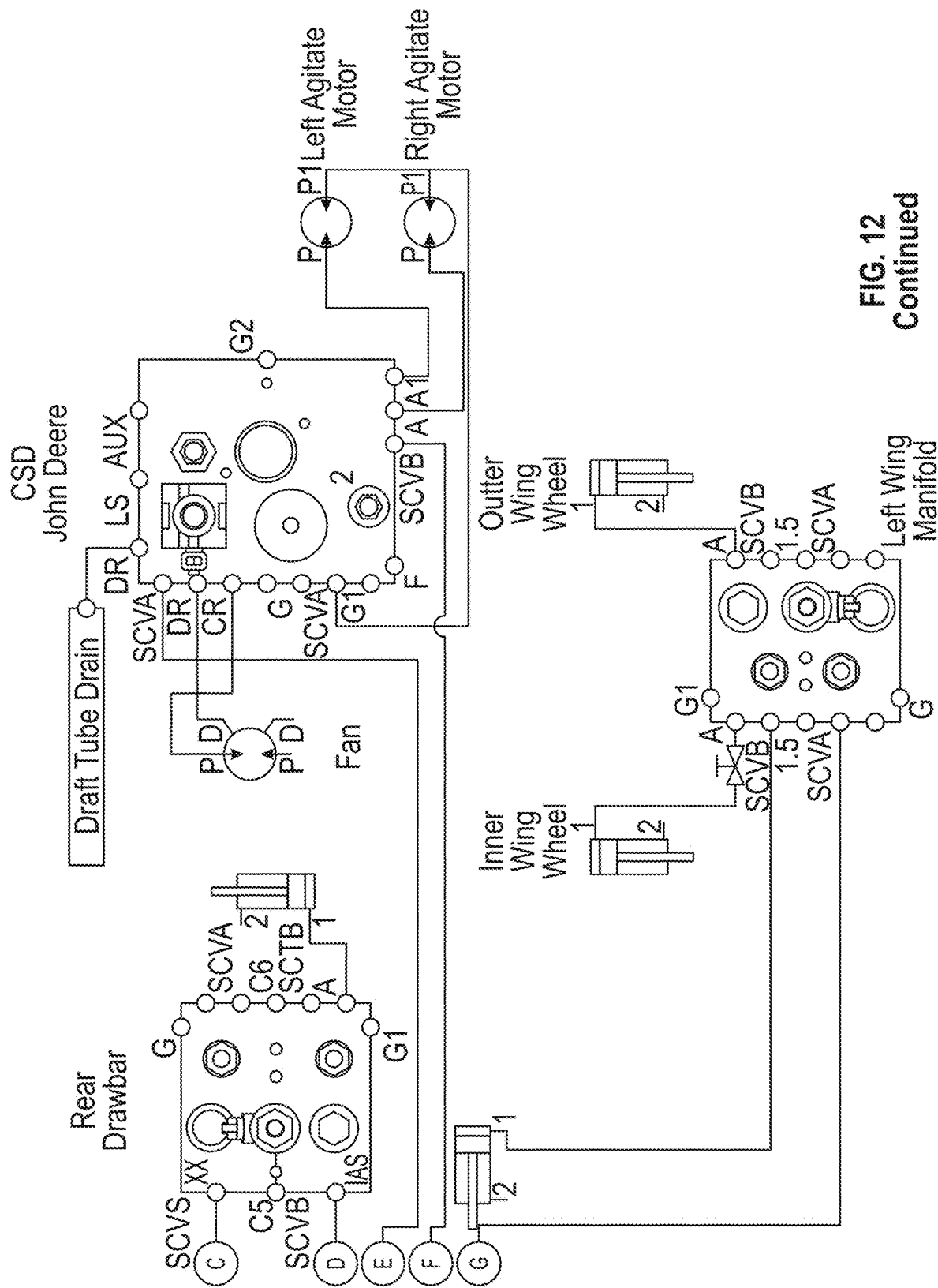
Figure 12:
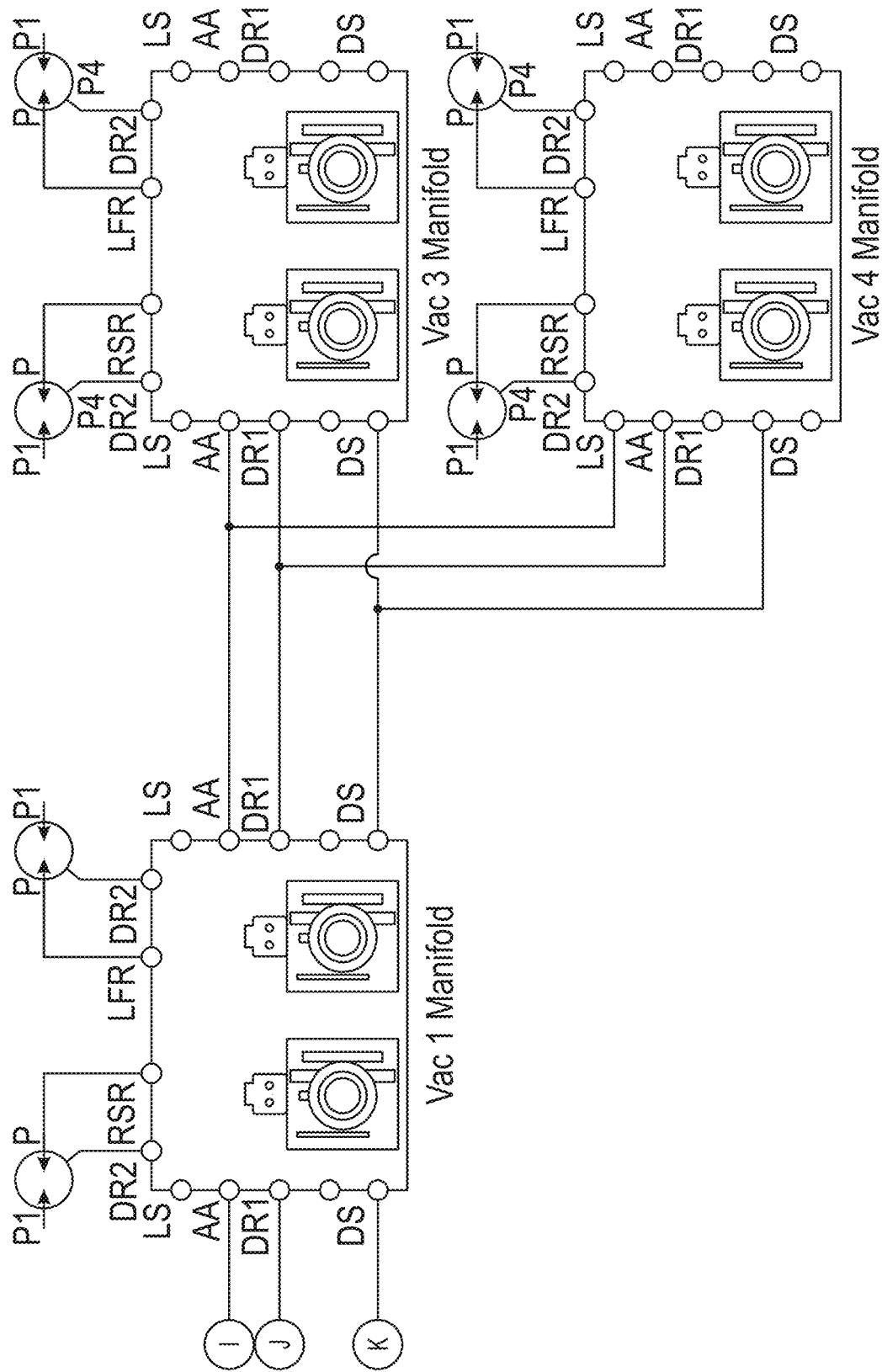
Figure 13:
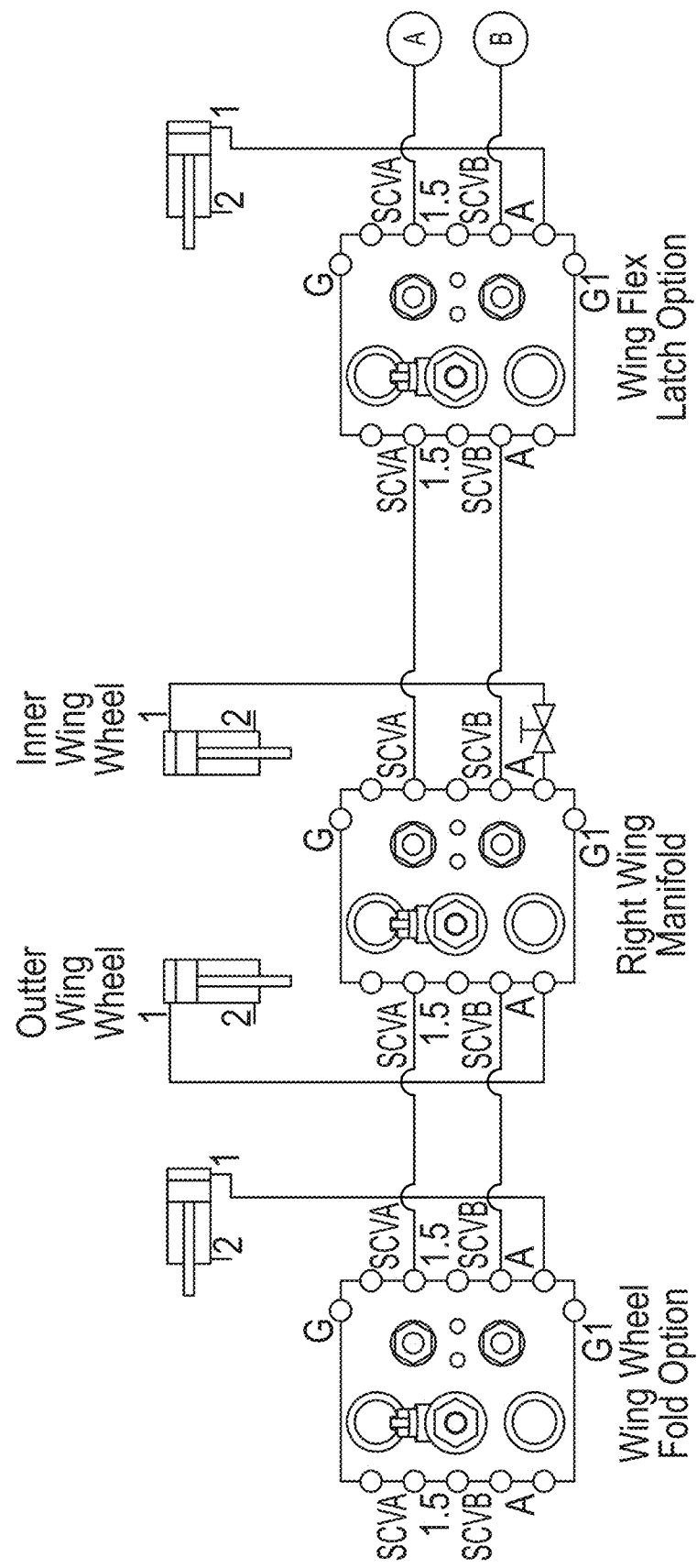
FIG. 13 is another hydraulic valve schematic for the toolbar height control system of the present invention.
Figure 13:
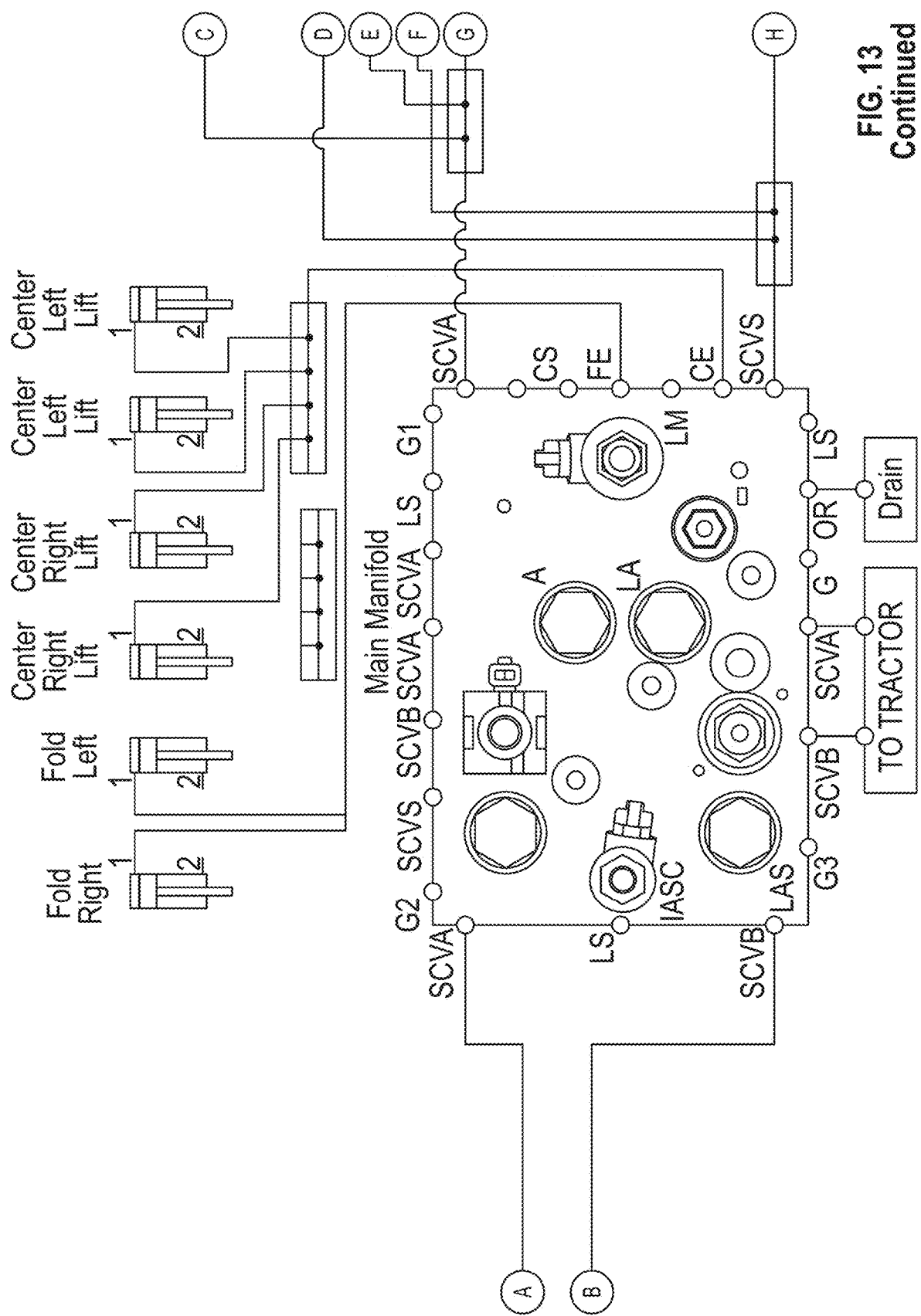
Figure 13:
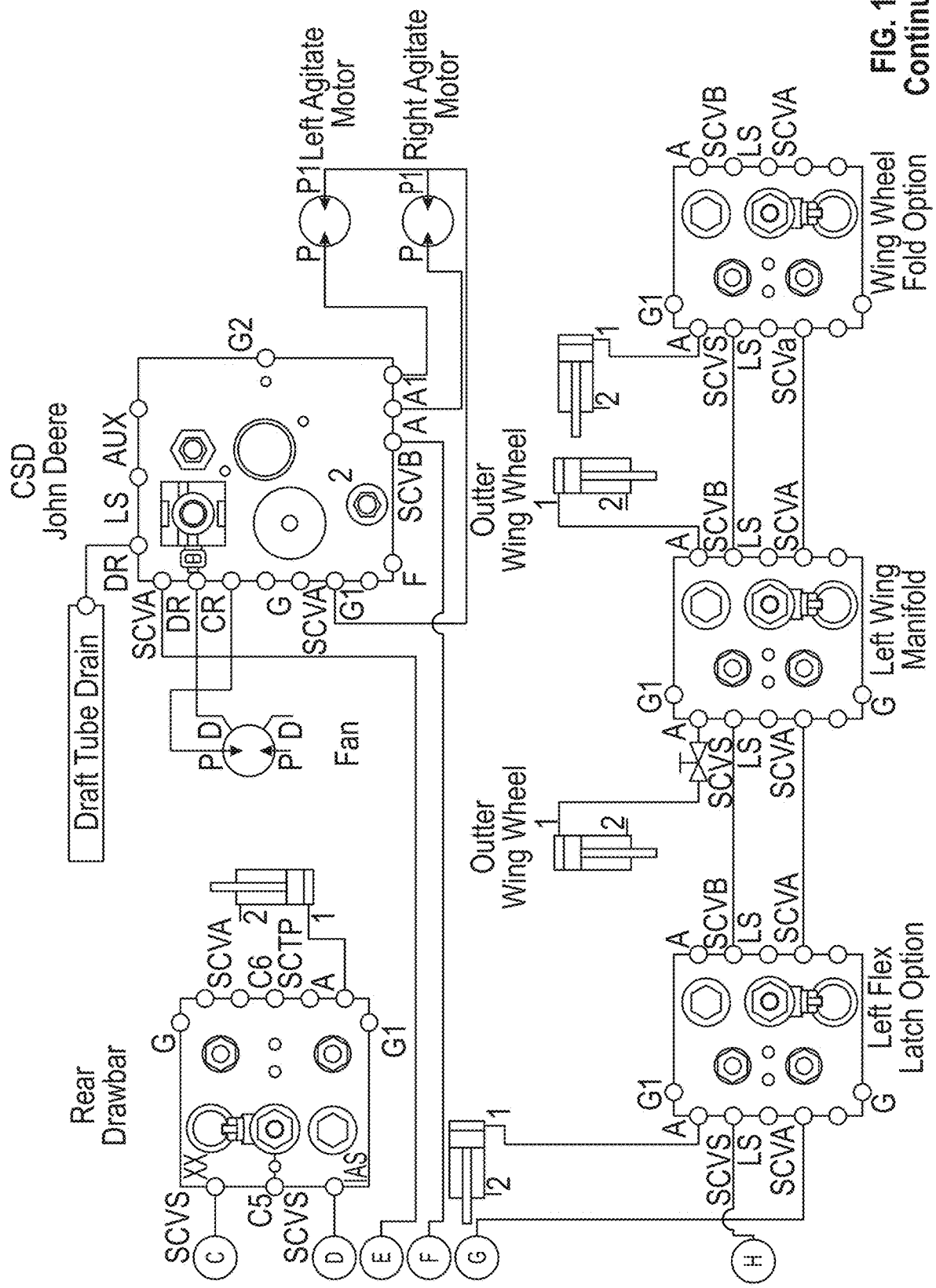
Figure 13:
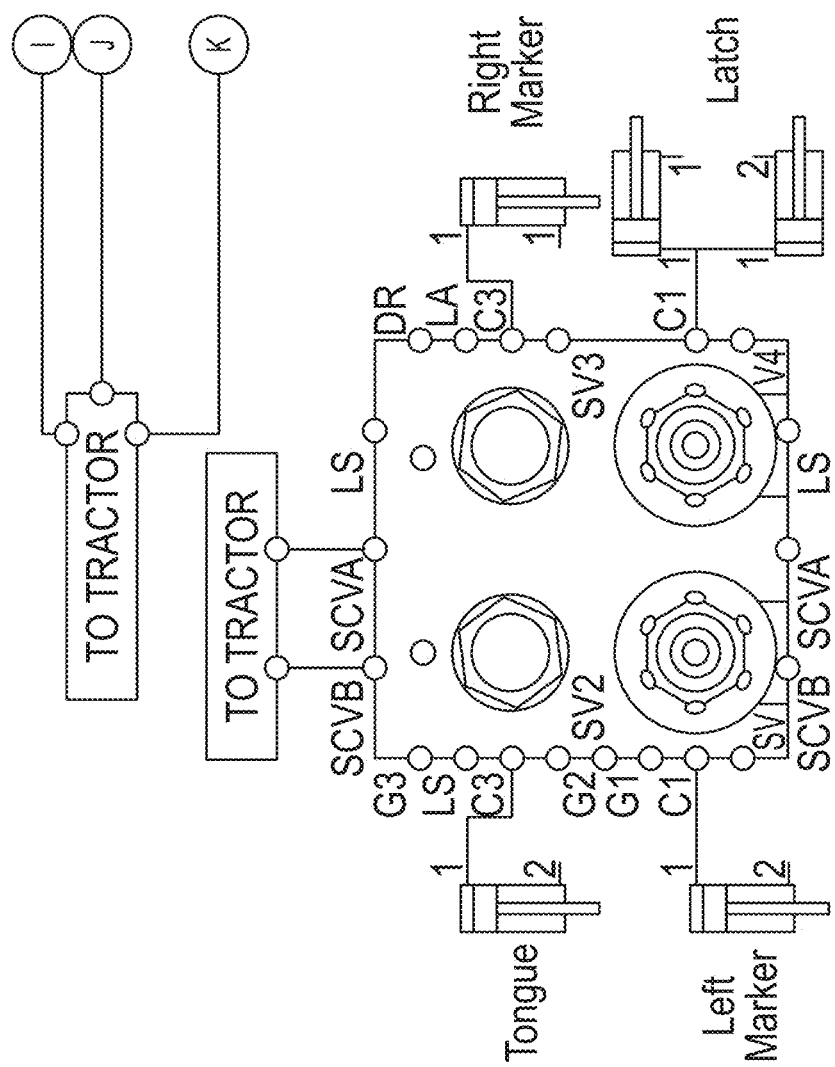
Figure 13:
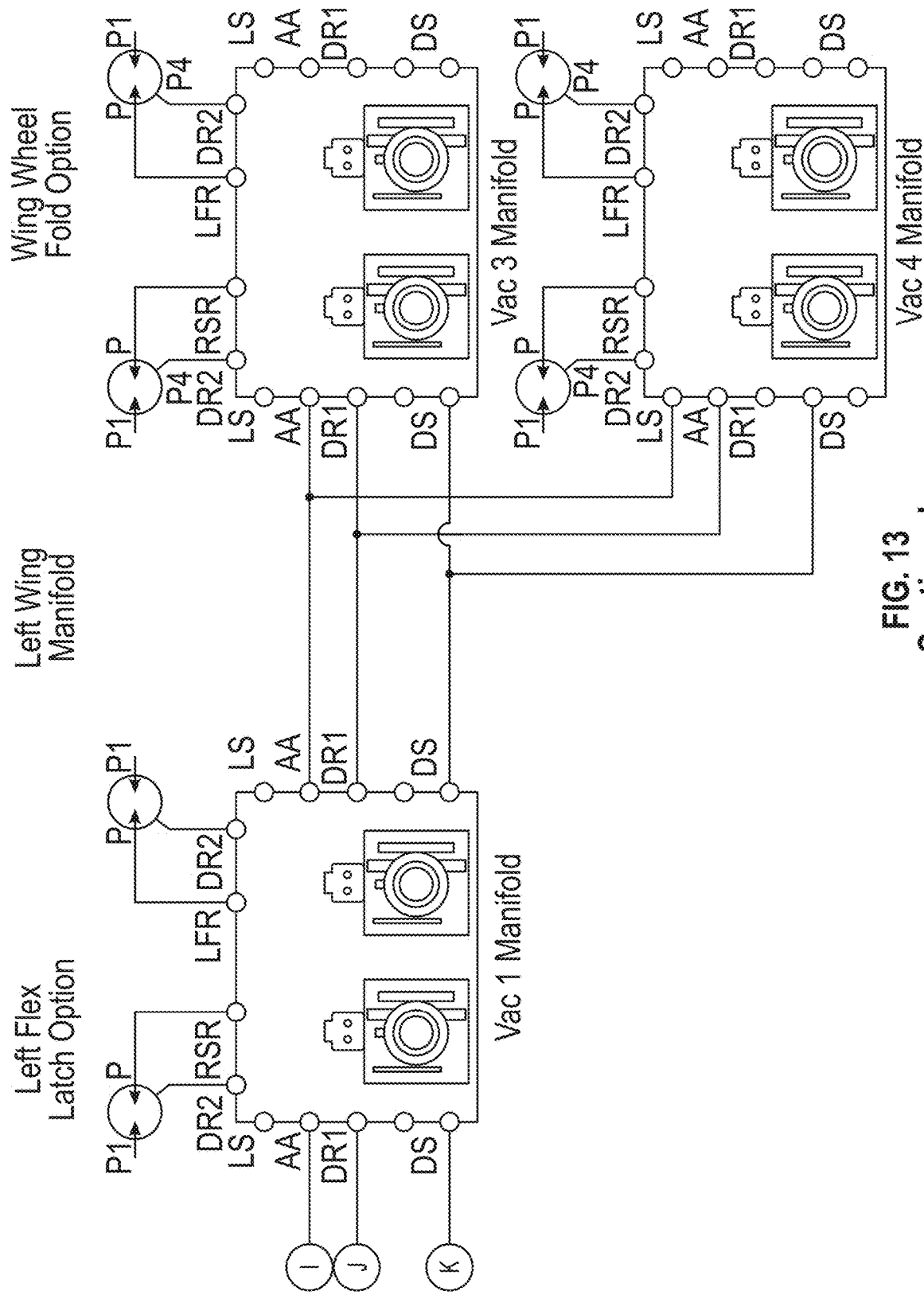

FIGS. 12 and 13 schematically depict the hydraulic layout and oil flow schematic for controlling toolbar options, such as hydraulically driven vacuum fans, Central Seed Delivery (CSD) fans and agitator motors, toolbar marker raise and lower cylinders, folding stepback and toolbar wing flex lock cylinders and latch assembly for a folding toolbar wing (described in Applicant's issued U.S. Pat. No. 10,251,330, incorporated herein in its entirety).

Hydraulic System Recap

This hydraulic system is very adaptable to many different hydraulically controlled features and options, without sacrificing the primary purpose of the system, which is accurately controlling the operating height of the toolbar, to achieve optimal planting depth of modern precision seed and fertilizer application systems.

I. Operation: This theory of operation is based on a Bar with all options with the Bar starting in the folded, lowered on the ground position, with the tractor hooked up, and running, with the HMI Powered up and with continue through the Un-Packing to operate in the field.

Figure 14:
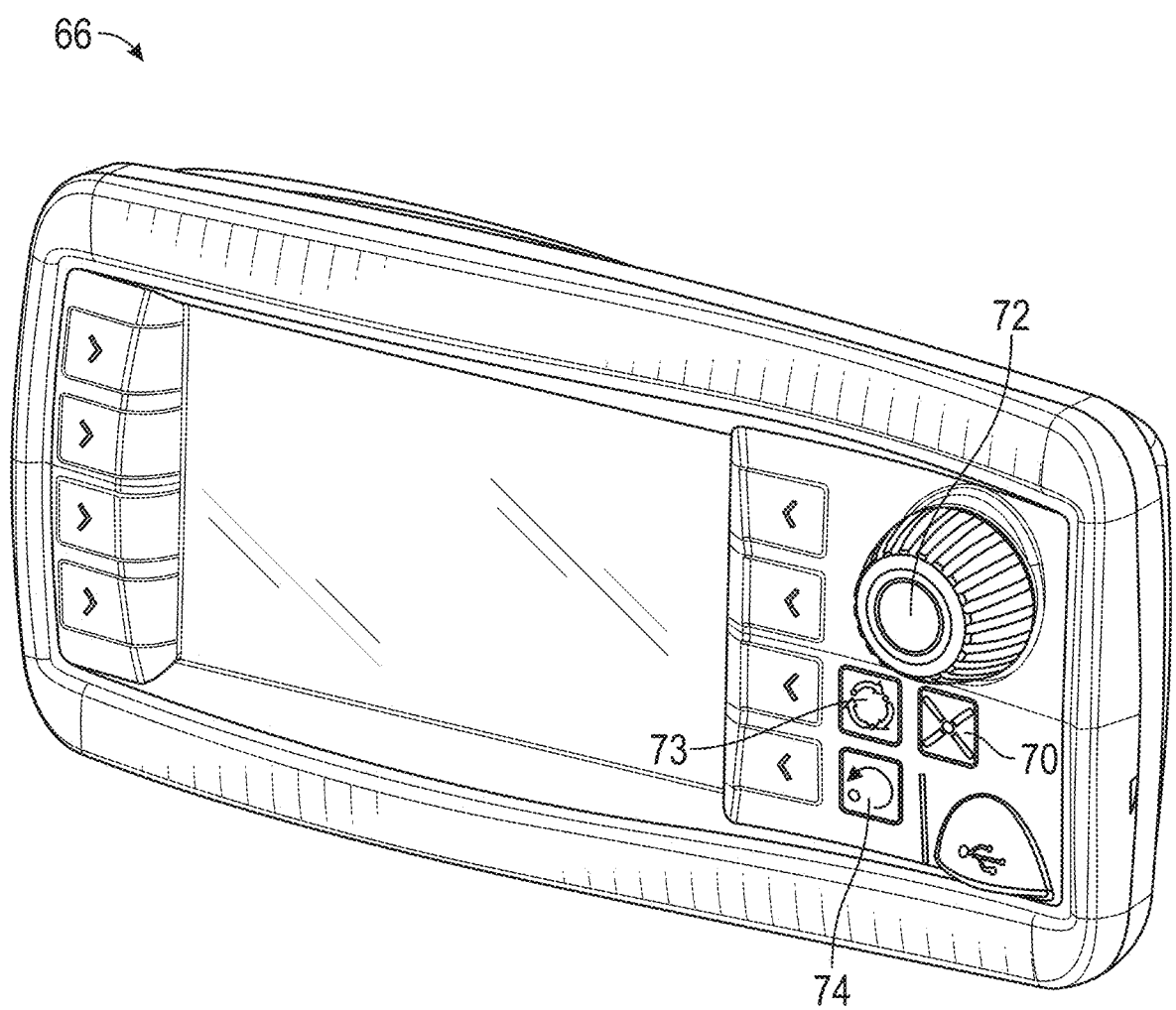
FIG. 14 is a perspective view of an example of a touch screen HMI for use with the toolbar height control system of the present invention.
Figure 15:
FIG. 15 is an example of the touch screen page for the "mode" function buttons.
Figure 15A:
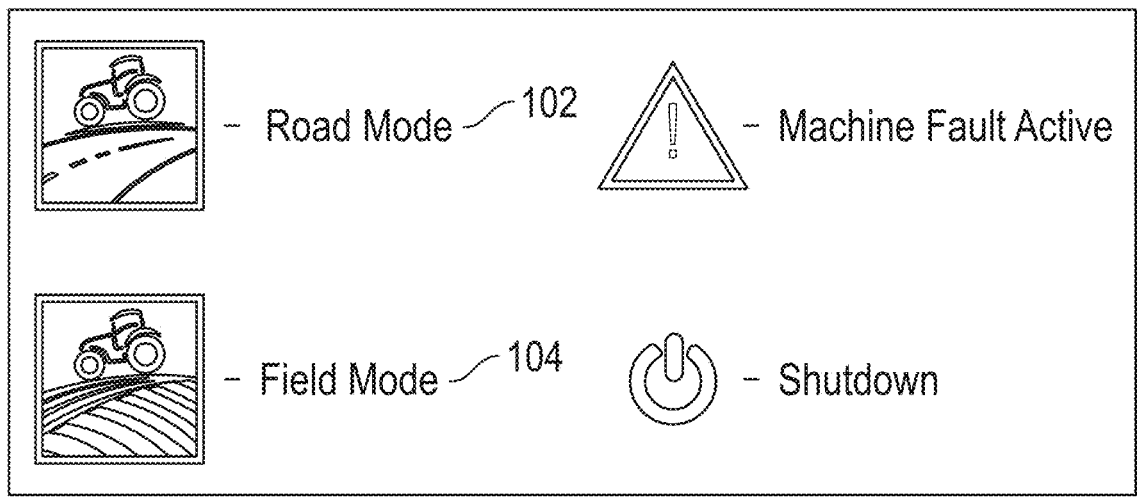
FIG. 15A is a legend for the control buttons shown in FIG. 15.
Figure 16:
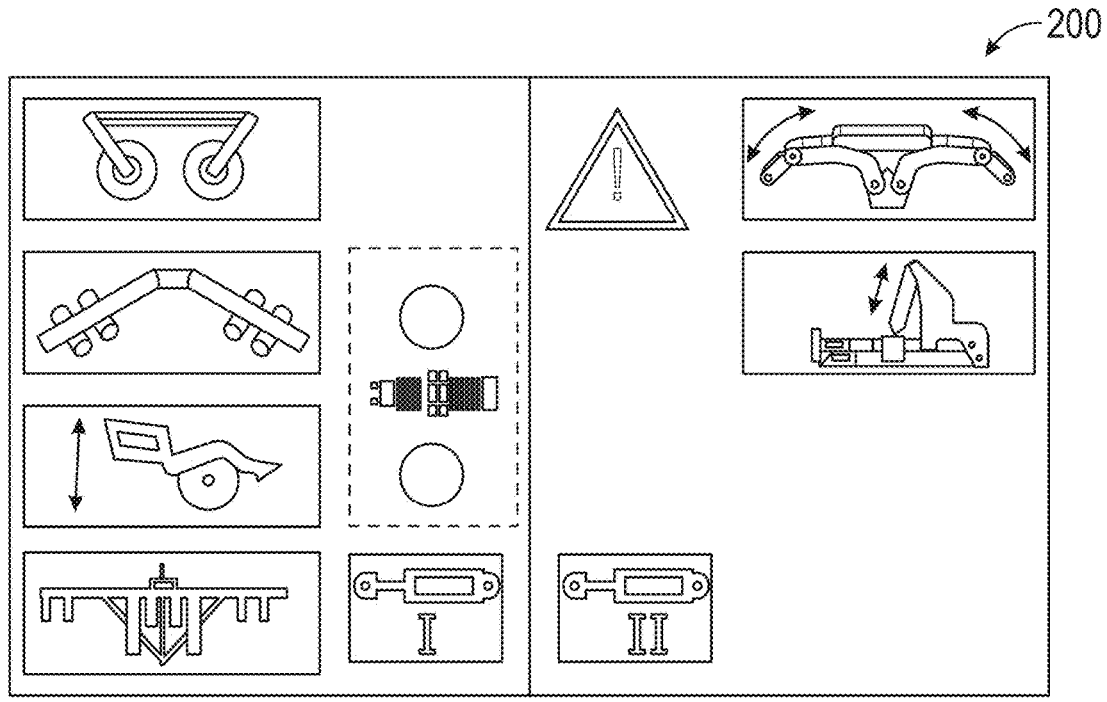
FIG. 16 is an example of the touch screen page for the "road mode" function buttons.
Figure 16A:
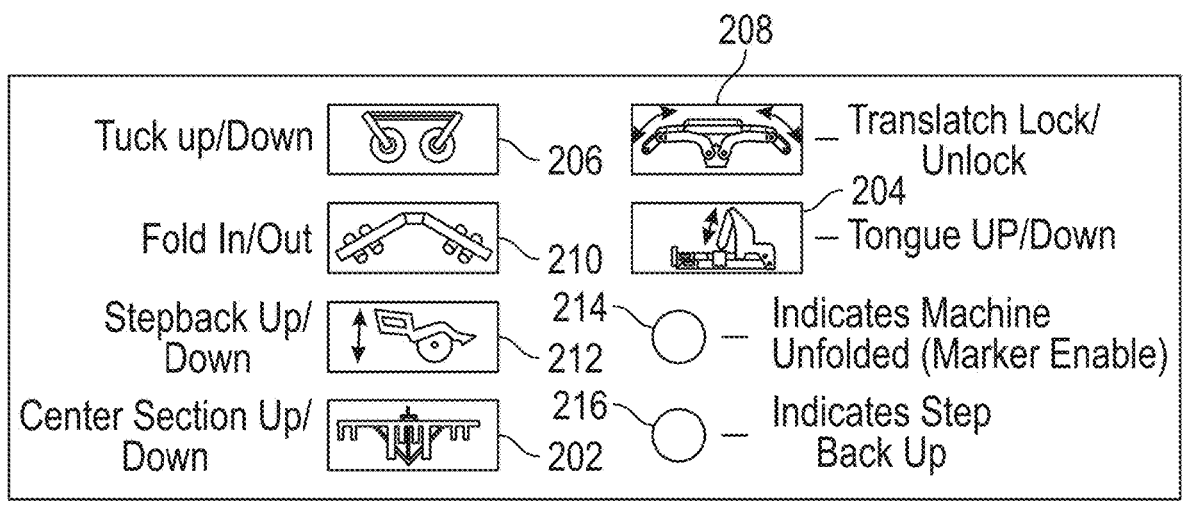
FIG. 16A is a legend for the control buttons shown in FIG. 16.

A. Mode Selection Page (FIGS. 15 and 15A): With the HMI powered up, the operator will be at the "Mode Selection" page 100.
  1. Road Mode Button: Select the "Road Mode" button 104.
  2. Field Mode: The operator can now proceed to the field operational mode by selectin the "Field" mode button 102.
B. "Road Mode" Page (FIGS. 16 and 16A): Once the Road button 104 has been selected, it will take the operator to the "Road Mode" page 200. On this page 200, the touch buttons that are on the far left and far right of the touch screen are linked and associated to the corresponding physical tactile buttons along each side for easier access by the operator. Also, for quick reference, the corresponding SCV is indicated by group of functions.
  1. Center Section Raise: Since the bar 10 is lowered onto the ground, the operator with have to first lift it to the 100% raised position by first selecting the center section button 202. Once the center section button 202 has been selected, the operator can now move the lever/joystick for SCV 1 in the aft direction to raise the center section 12 of the bar 10 or in the forward direction to lower the center section 12 of the bar 10 until it is in the desired position (in this case, the 100% raised position). If the center section 12 were to drift in the lowered direction greater than 5% of the commanded position, then a popup warning will appear and a warning horn will sound to alert the operator to correct it in the instance that they chose not to use the cylinder stops as advised during transport.
  2. Tongue Raise: With the center section 12 now in the 100% raised position, the operator will now have to adjust the front of the bar 10 with the tongue 20 so that the center frame tube is close to parallel to the ground by selecting the tongue button 204. Once the tongue button 204 has been selected, the operator can now move the lever/joystick for SCV 2 in the aft direction to raise the tongue 20 or in the forward direction to lower the tongue 20 until the center frame 12 of the bar 10 is in the desired position.
  3. Tuck/Un-Tuck: With the tongue 20 adjusted to the desired position, the operator can now tuck or un-tuck the wing wheels 16 by selecting the tuck button 206. Once the tuck button 206 has been selected, the operator can now move the lever/joystick for SCV 1 in the aft direction to lower the wing wheels 16 to the ground for the field position of the tool bar 10 or in the forward direction to lift the wing wheels 16 off of the ground for road transport of the tool bar 10. When the wing wheels 16 are lowered to the ground, the wheels 16 lift the wing frames of the bar 10 to the desired position.
  4. Trans Latch Disengaged: With the wing wheels 16 lowered or un-tucked, on the ground, and supporting the wing frames, the operator can now release the transportation latch 68 by selecting the trans latch button 208. Once the trans latch button 208 has been selected, the operator can now move the lever/joystick for SCV 2 in the aft direction to engage the transportation latch 68 with the tongue 20 or in the forward direction to disengage the transportation latch 68 from the tongue 20. One example of such a latch 68 is shown and described in Applicant's issued U.S. Pat. No. 10,251,330.
  5. Un-Fold: With the transportation latch 68 disengaged, the operator will now be able to un-fold the bar wings 14 by selecting the Fold button 210. (If equipped with the Folding Stepback option, that the Folding Stepbacks must be in the 100% raised position, which is indicated by the status feedback light adjacent to the Folding Stepback button, prior to un-folding the wings 14. Failure to do so can result in damage to the Folding Stepbacks, their associated row units, and tracks/wheels 22). Once the fold button 210 has been selected, the operator can now move the lever/joystick for SCV 1 in the forward direction to un-fold the bar wings 14 or in the aft direction to fold the bar wings 14. (The operator may need to slowly "CREEP" the tractor forward while un-folding the bar and backwards while folding the bar to assist in this process).
  6. Trans Latch Re-Engage: With the bar now un-folded, the operator will now need to re-engage the trans latch 68 by selecting the trans latch button 208. Once the trans latch button 208 has been selected, the operator can now move the lever/joystick for SCV 2 in the aft direction to engage the trans latch 68 or in the forward direction to disengage the trans latch 68. When the bar 10 is 100% un-folded, its un-folded position proximity switch should be activated and will be indicated by the status feedback light 214 adjacent to the fold button 210 With a green feedback light meaning the sensor is active, red feedback light meaning the sensor is inactive.
  7. Folding Stepback Lower: With the bar 10 un-folded and the trans latch 68 engaged, the operator will now be able to lower the Folding Stepback's, if equipped, by selecting the folding stepback button 212. Once the folding stepback button 212 has been selected, the operator can now move the lever/joystick for SCV 1 in the aft direction to raise the Folding Stepback or in the forward direction to lower the Folding Stepback. The selected stepback button 212 will automatically deactivate after *X-seconds* or once the 100% raised position proximity switches are activated. The operator can also press an active Stepback button 212 to deactivate it. When the Folding Stepback's are in the 100% raised position, then both of the position proximity switches should be activated and will be indicated by the status feedback light 216 adjacent to the stepback button 212 with a green feedback light meaning the sensor is active, and a red feedback light meaning the sensor is inactive.
  8. With the bar 10 un-folded, the trans latch 68 engaged, and the Stepback's lowered (if equipped), the operator can now move the tongue 20 to the Field Operation position by selecting the tongue button 204. Once the tongue button 204 has been selected, the operator can now move the lever/joystick for SCV 2 I the aft direction to raise the tongue 20 or in the forward direction to lower the tongue 20. In this case, the 100% lowered position. At this point, the bar 10 has been successfully un-packed, raised up and is physically in the field operation state where the operator can now exit the "Road" Mode page 200 and proceed back to the "Mode Selection" page 100 (FIG. 15) by pressing the tactile hard key 70 on the HMI (FIG. 14).
C. "Field Mode" Page (FIGS. 17 and 17A): Once the field button has been selected, it will take the operator the "Field Mode" page 300. On this page, the touch buttons that are on the far left and far right of the touch screen are linked and associated to the corresponding physical tactile buttons along each side for easier access by the operator. The buttons on the far right are sub-menu buttons and are visible on all Field pages. Also, for quick reference, the corresponding SCV is indicated by group of functions. From this main Field Mode page 300 the operator will have single layer access to the primary controls, feedback, as well as have access to drill down to further sub menus for configuration and or detailed adjustments of each option and feature. Also, only options that are equipped on the bar will have their corresponding controls on the Field Mode page 300.

Figure 17:
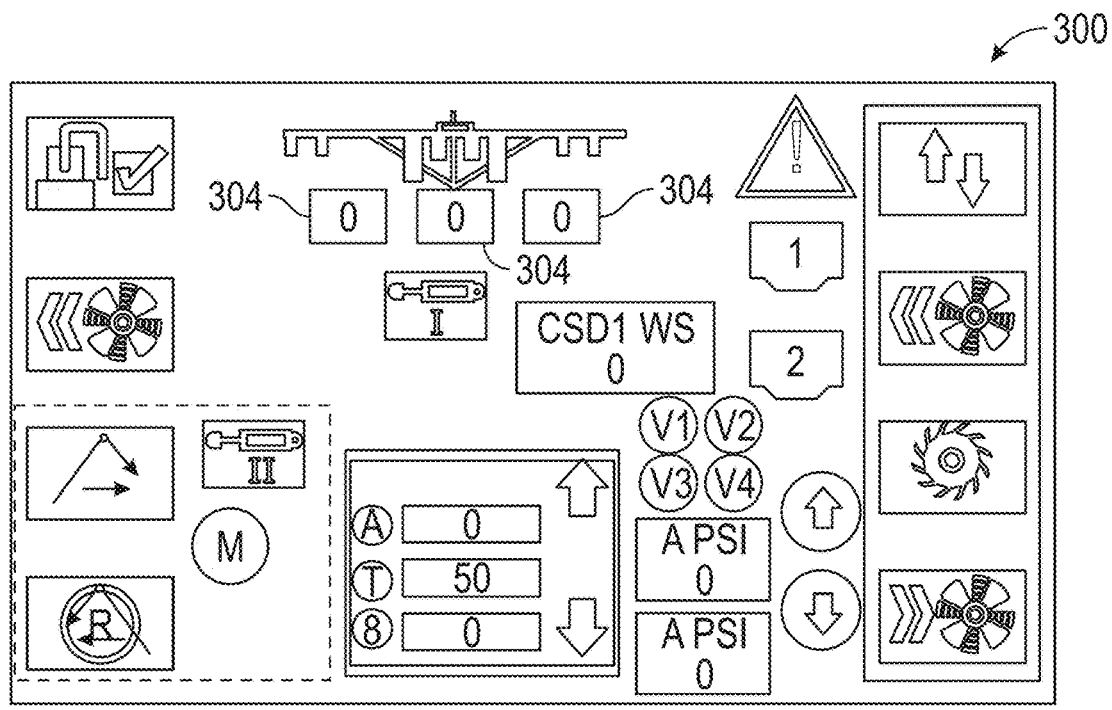
FIG. 17 is an example of the touch screen page for the "field mode" function buttons.
Figure 17A:
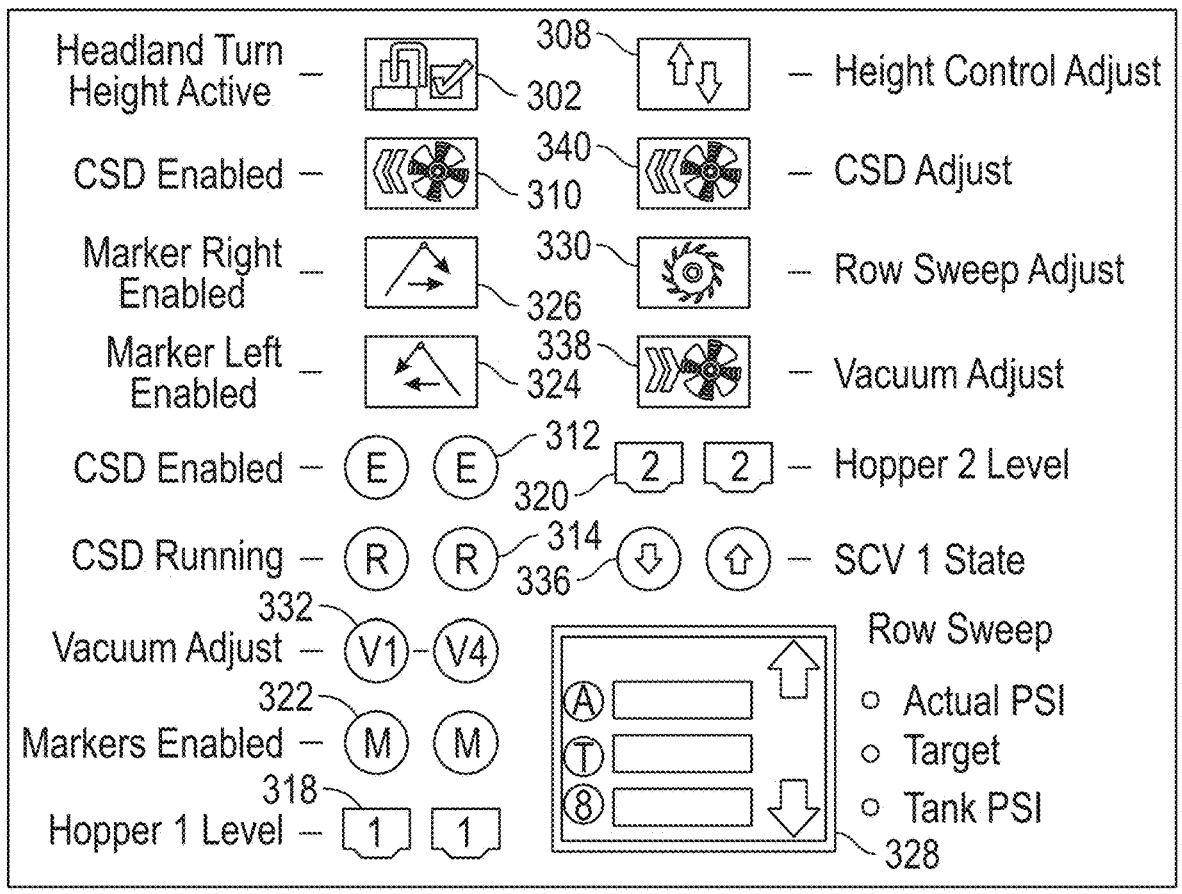
FIG. 17A is a legend for the control buttons shown in FIG. 17.
Figure 18:
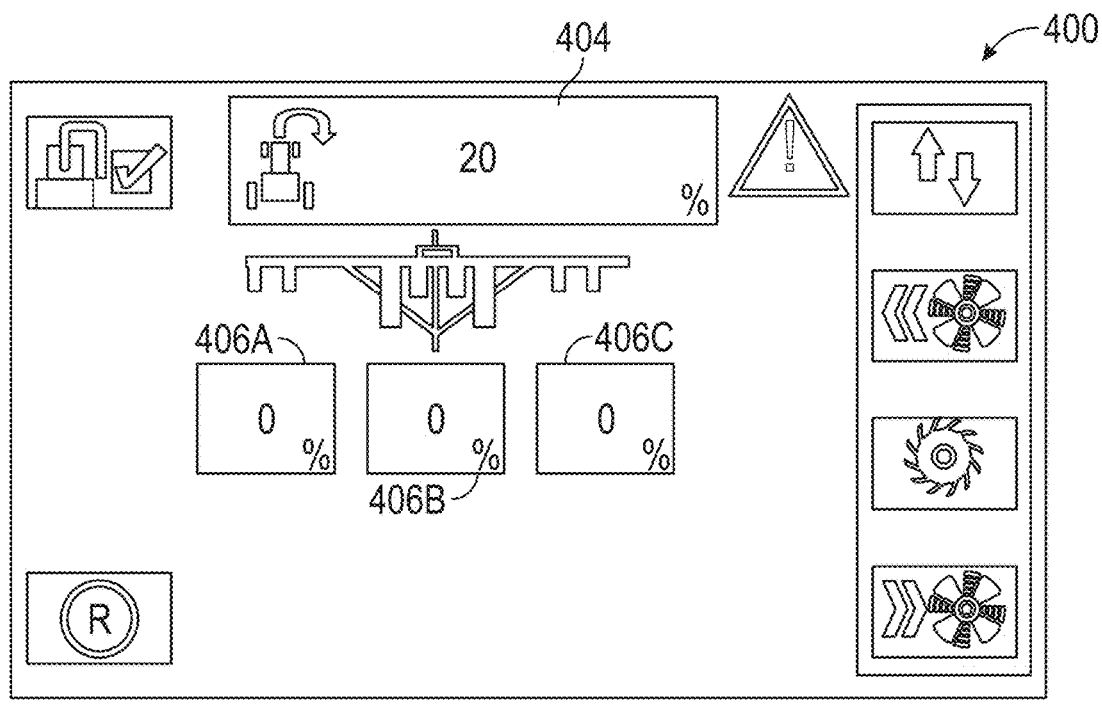
FIG. 18 is an example of the touch screen page of the "height adjustment" function buttons.
Figure 18A:
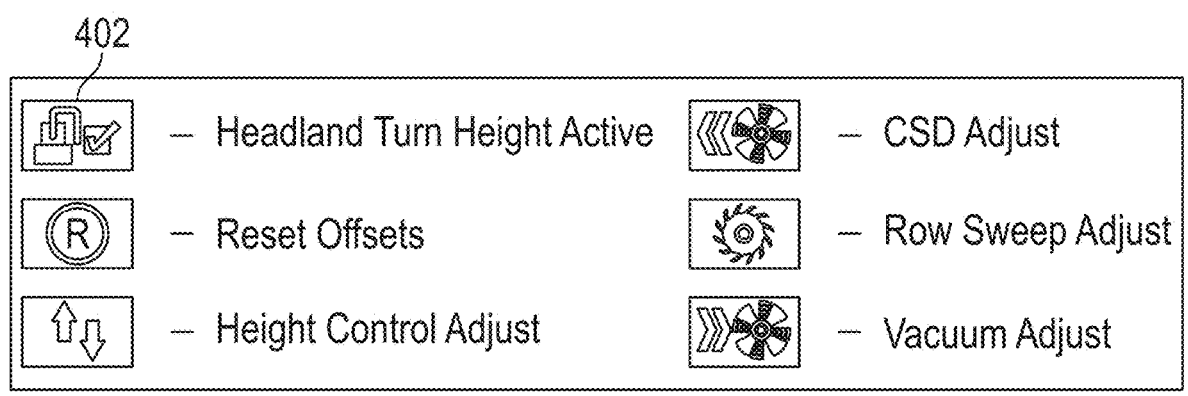
FIG. 18A is a legend for the control buttons shown in FIG. 18.
Figure 19:
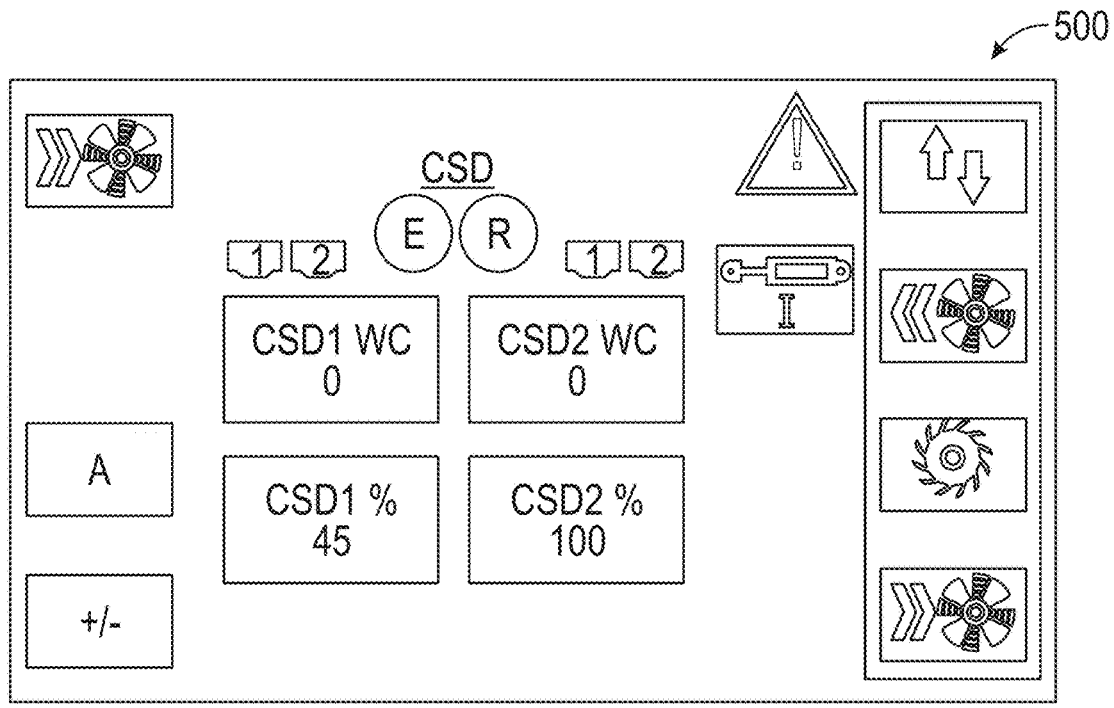
FIG. 19 is an example of the touch screen page for the CSD function buttons.
Figure 19A:
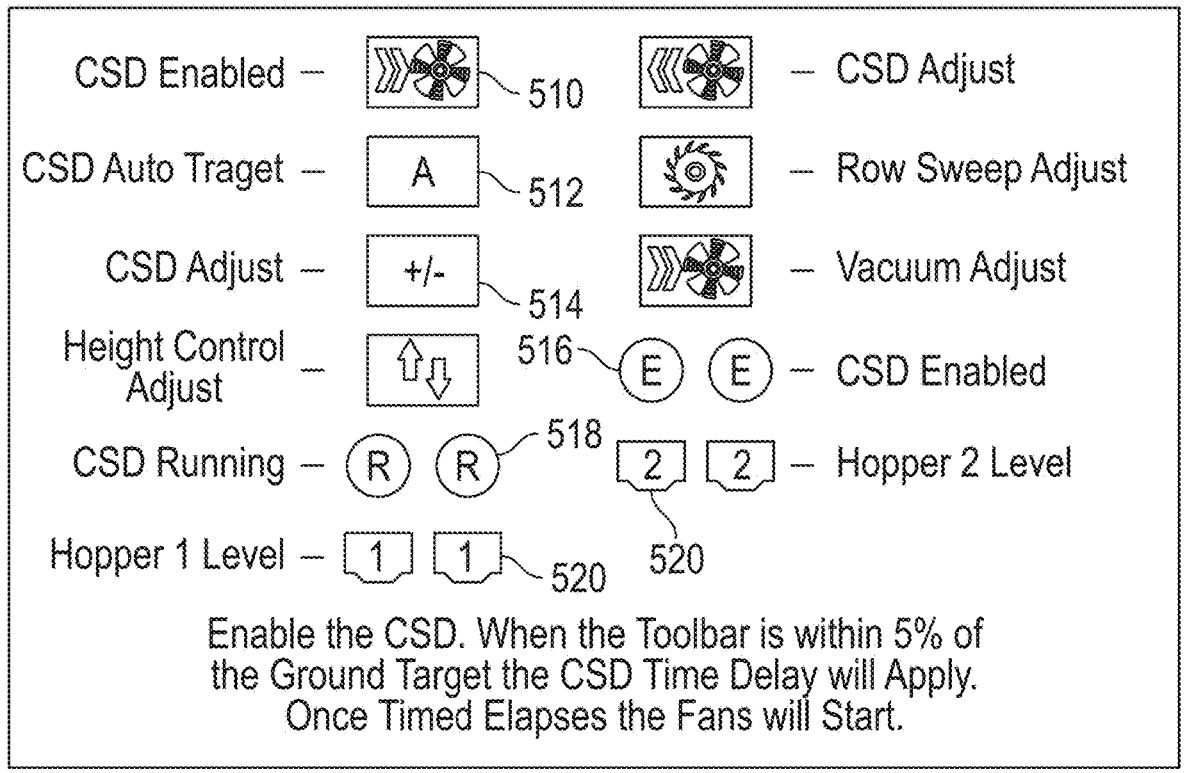
FIG. 19A is a legend for the control buttons shown in FIG. 19.
Figure 20:
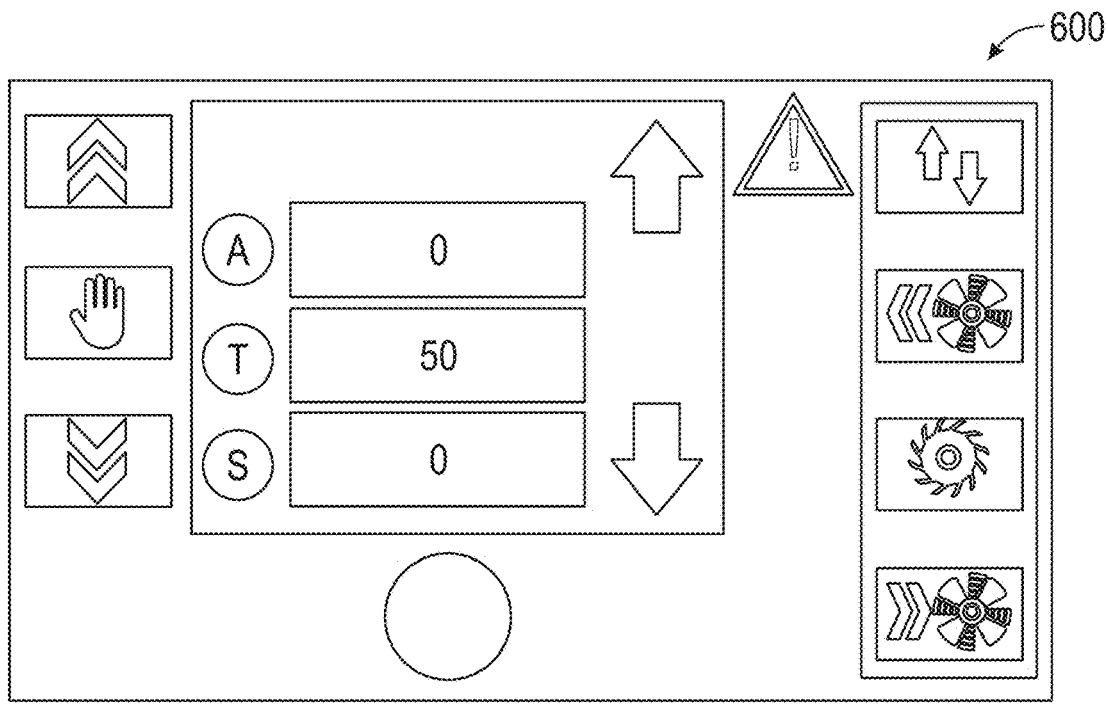
FIG. 20 is an example of the touch screen page for the "sweep" function buttons.
Figure 20A:
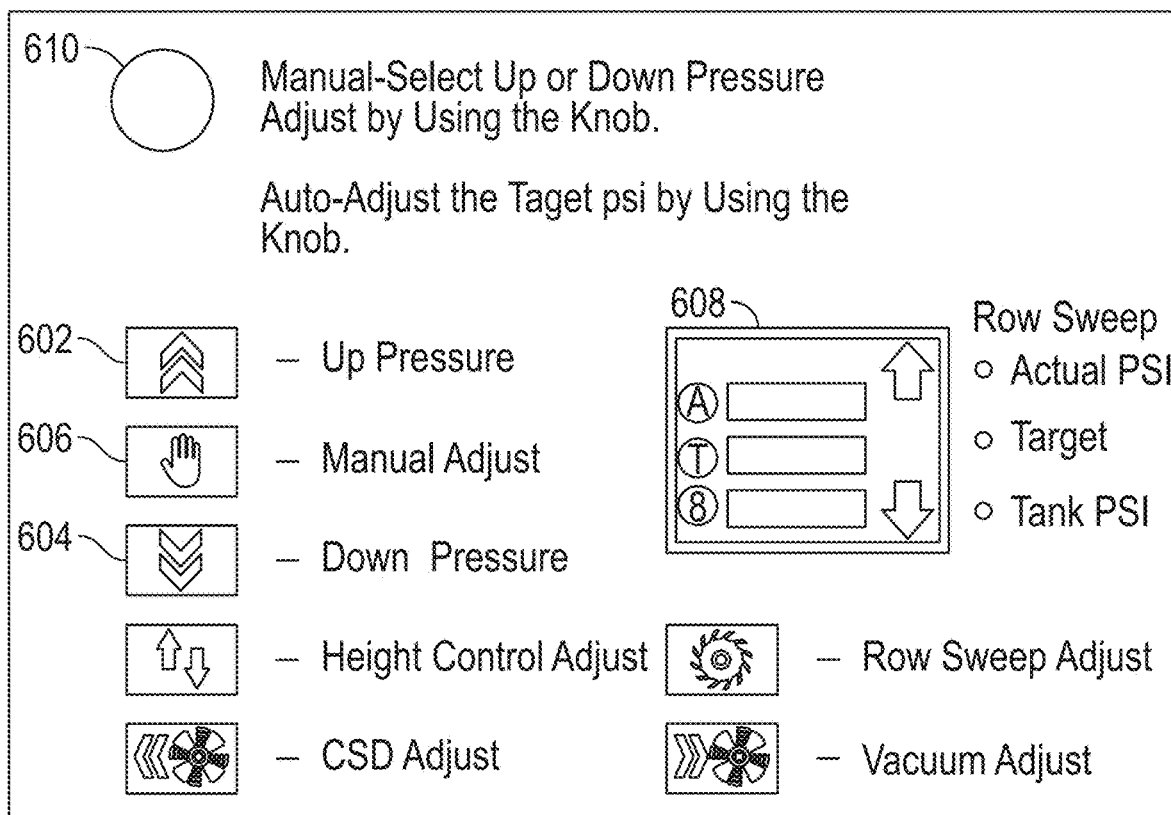
FIG. 20A is a legend for the control buttons shown in FIG. 20.
Figure 21:
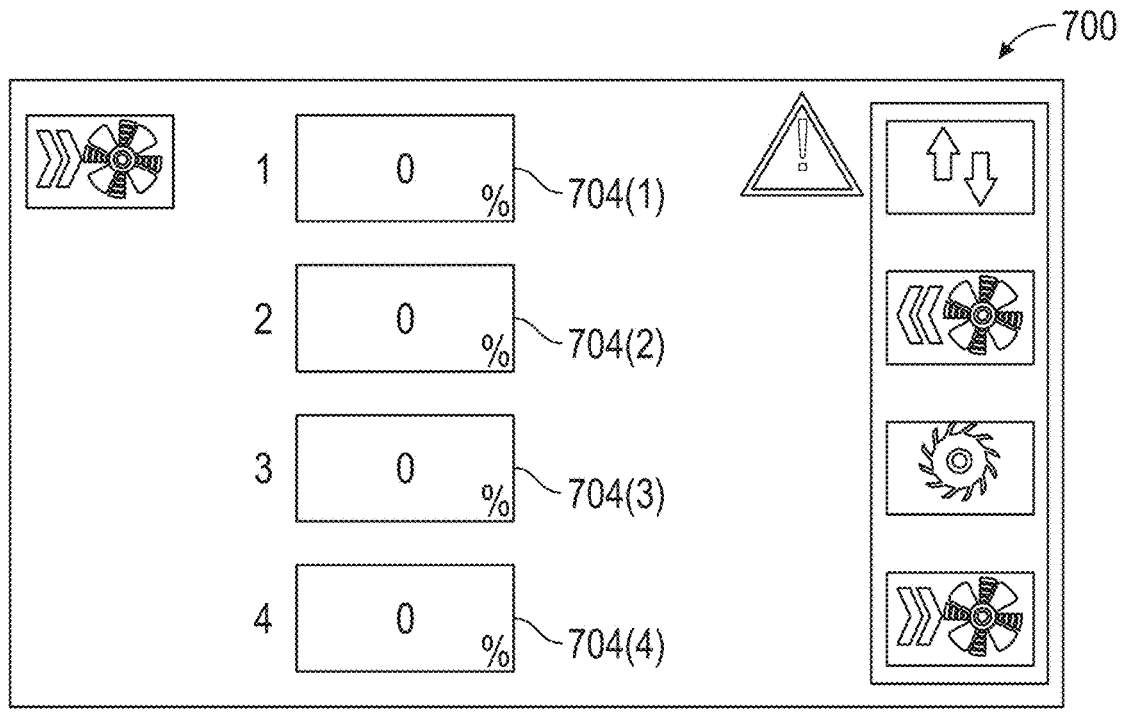
FIG. 21 is an example of the touch screen page for the "vacuum fan" function buttons.
Figure 21A:
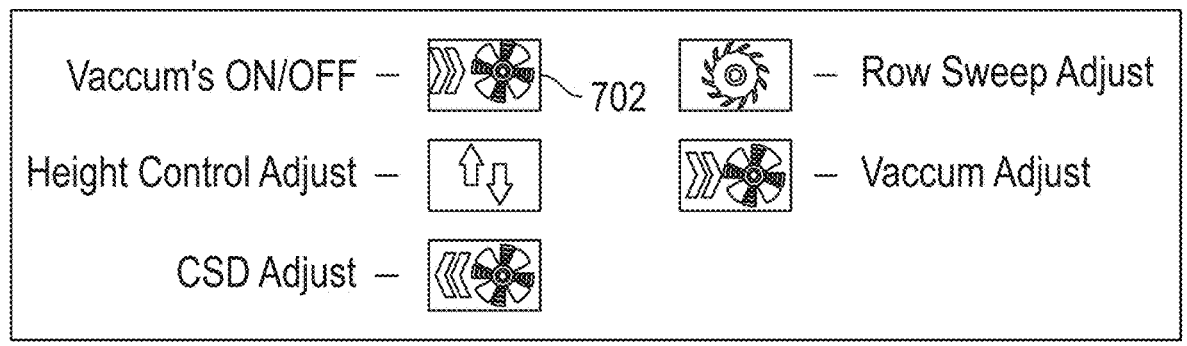
FIG. 21A is a legend for the control buttons shown in FIG. 21.

1. Headland Turnaround: This function, when enabled by selecting its button 302, will automatically stop the bar during a lift sequence when the bar position reaches the "percentage of lift" setting that is set by the operator in the Height Adjust page 400 (FIGS. 18 and 18A). This function can shorten the headland turnaround cycle time because it is not always necessary to lift the bar to 1000% of the lift range during a headland turnaround. This function allows the operator to set the stop height so that the bar will only lift enough for the row units to clear the ground when turning around. This function is also easily disable in the instance where the bar must be lifted higher than this setting in a scenario such has crossing a ditch. It can then be easily re-enabled again by selecting the button 302.
2. Bar Position Feedback 304: This icon 304 has three independent feedback display boxes, 306A, 306B, 306C, one for the right wing, center section and left wing. These display boxes will display the position of each axis in relation the percentage of lift of the factory calibrated 100% lift to the "Dirt" or 100% lowered range.
3. CSD: If equipped with a CSD option, then the following items are associated with it on the "Field Mode" page. (This system currently can control up to 3 CSD system but due to available space on the Field Mode page, only the first one is displayed in FIG. 17). CSD Enable/Disable, the operator can enable or disable this function by pressing the CSD button 310. Adjacent to the CSD enable button 310 are two indicators. The closest being the CSD enabled/activated indicator 312. This indicator 312 will turn green when the CSD function has been enabled or turned on. This does not indicate that the CSD fan and agitate motors (if equipped) are running. The furthest being the CSD running indicator 314. This indicator 314 will turn green when the CSD is actually running. The CSD is commanded by the automation system to run when two conditions have been met. The first being when the bar is being lowered and is within a certain percentage of the target "Dirt" position. Once the bar is within this range, it will now start an on delay timer, that when this time setting in seconds, has been reached, it will now turn the CSD fan and agitate motors (if equipped) on and will be indicated by the green running light. Both the "within certain percentage of target "Dirt" position setting" and the "On Delay timer time setting, in seconds" are both adjustable by the operator.
4. CSD Feedback:
Plenum Air Pressure/Fan RPM:
This display box 316 will display the preferred CSD feedback, either air pressure in WC, or fan speed in RPM (if equipped with speed sensor).
CSD commodity tanks low level indication lights 318, 320 are
green if the product level is above the level sensor, red if the product is below the level sensor. There preferably is one sensor per tank. If the operator would like to adjust the CSD settings, then they will need to do so on the CSD page 500 (FIGS. 19 and 19A). To get to this page, the operator will need to press the CSD button 310 on the Field page 300 (FIG. 17).
5. Marker: If equipped with the field marker option, there are two modes of operation that the operator can chose from. The first being "manual mode" and the Second being "automatic mode" and is displayed by the marker sequence mode indicator 322. The operator can change the mode by pressing and holding either of the left or right marker buttons 324, 326, for 2 seconds. When in the manual mode, the operator must enable one or both of the left and right field markers and control them by using a lever/joystick (not shown) for SCV 2 in the aft direction raise the marker(s) or in the forward direction to lower the marker(s). When in automatic mode, the operator will select the appropriate marker for the current field position. Once the bar is lowered and the marker is deployed, then upon the next bar lift sequence (headland turn around), the automation system will automatically switch to the other marker when the bar reaches a certain percentage of lift. This is so that when the turnaround is complete, then the opposite marker is lowered by using the lever/joystick for SCV 2 in the aft direction raise the marker(s) or in the forward direction to lower the marker(s). This feature makes it convenient, so the operator does not need to continually switch from one marker to the other but rather gives them the option to have both independent control as well as a certain degree of automation by an electronic version of a hydraulic marker sequence valve.
6. Sweep: If equipped with the field sweep assembly option, one of three modes of action will be displayed on the icon 328: (1) Up Force, or adding pressure to lift some of the sweep assembly weight off of the ground (upper arrow illuminated or different color); (2) Down Force, or adding pressure to add downward force "more weight" to the sweep assembly (lower arrow illuminated or different color); or (3) Hold or manual adjust, where it maintains its current state. In addition to the modes being displayed, there are three values that are displayed: Actual Pressure (A) at the row units. Target Pressure (T) at the row units. This setting is what the automation system will automatically target for the actual pressure to the row units. Supply pressure (S) from the air compressor. If the operator would like to adjust the Sweep settings, then they will need to do so on the Sweep page 600 (FIGS. 20 and 20A). To get to this page, the operator will need to press the Sweep button 330 on the Field page 300 (FIGS. 17 and 17A).
7. Vacuum Fan: On the main Field Mode 300 page (FIGS. 17 and 17A), the individual status indicators 332 of up to 4 vacuum fans. A red light indicates an OFF condition, and a green light indicates an ON condition. Since the operation of the vacuum fans are a critical function in certain field applications, such as planting, then the SCV that is used is for the vacuum fans only and once enabled and in the Field Mode then they will be ON while in the field mode. To set up the vacuum fans, the operator will need to press the vac fan button 338 on the Field Mode page 300. Once the vac fan button 338 has been selected, it will take the operator to the "Vac Fan" Page 700 (FIGS. 21 and 21A). On this page, the operator can turn on the vacuum fans by pressing the Vacuum ON/OFF Button 702. There are four adjustment boxes 704(1), 704(2), 704(3), 704(4), where the operator can select each individual fan and independently adjust the speed of that fan so that there is an equal vacuum reading throughout the entire bar vacuum system. Vacuum sensors placed throughout the vacuum system will provide feedback on the vacuum fan page 700 as well as the feedback so that all vacuum fans can automatically adjust to balance to achieve a uniform vacuum reading, simultaneously increase or decrease the vacuum setting, and indicate faults such as increase of leaks, plugged fans, or required hydraulic consumption has exceeded the supply.

To adjust any of the vacuum fan settings, the operator will tap the adjustments box 704(1), 704(2), 704(3), 704(4), that is adjacent to the vacuum fan number to be adjusted. When that box is selected, an HMI Rotary Encoder Knob icon 706 will appear on the HMI touch screen 66 (FIG. 14).

This knob icon 706 indicates that the operator will need to use the Rotary Knob 72 on the HMI 66 to adjust this setting, for example, rotate clockwise to increase the value, and rotate counterclockwise to decrease the value.

To exit the vacuum page 700 and return to the previous field page 300 the operator will need to press the back button 7 on the HMI 66 or if left inactive for 30 seconds then it will automatically transition back to the main field page.

8. Hydraulic Supply and Lift Indication: to aid the operator in monitoring system performance there are several pieces of information available on the Field Mode page 300 (FIGS. 17 and 17A).

These pressure readouts 334 are monitored directly in the lines coming from the tractor and with this the operator can monitor backpressure, operating pressure, and tractor performance. For example, to determine the backpressure going back to the tractor, the operator can see that when they are operating a function such as a higher flow option like the CSD, the lesser of the two pressure readings is going to be the system back pressure. To determine what it takes to lift the entire machine then the operator can take the A and B pressure at the same time during the lift, then take the highest of the two pressure readings minus the lowest of the two pressure readings and that will give them the true operating pressure for what they were doing. To determine the health of the tractor, if the lift speed slowly degrades through the day of operation, but the pressure required to operate the bar does not noticeably change, then it is a good sign that the hydraulic system on the tractor may be degrading.

Automation System Commanded Direction: these indication icons 336 will display direction of the automation systems commanded movements by turning green in the commanded direction.

D. Height Adjust Page: Once the height adjust button 308 has been pressed, it will take the operator to the height adjust page 400 (FIG. 18). Under the height adjust Page 400, the operator can also enable/disable the headland turn around feature with the button 402, as this is useful for determining what the best value for this setting is. To set the headland turnaround height as percentage of lift, press to select the adjustment box 404, press again to unselect the adjustment box. The operator also has the ability to set the bar height offset of the right wing, center section, and left wing which will automatically stop the bar at the set height during a bar lowering sequence. This is beneficial when the bar is loaded down, causing the center section heels/tracks to run deeper in the soil then the wings and causing the row unit arms to not run parallel to the ground. For example, if due to bar weight and soil conditions, the center section heel/tracks were running 4" deeper than the wings wheels then the operator would be able to adjust the Center Section offset so that it would stop lowering 4" higher that it's actual lowest point. This feature can be thought of as an electronic cylinder stop. To set the bar height offset as percentage of light, press to select any of the three adjustment boxes 406A, 406B, 406C, press again to unselect the adjustment boxes. When any of the adjustment boxes 406A, 406B, 406C, are selected, an HMI rotary encoder knob icon 408 will appear. This icon 408 indicates that the operator will need to use the Rotary Knob 72 (FIG. 14) on the HMI to adjust this setting, i.e., rotate clockwise to increase the value, rotate counterclockwise to decrease the value. To clear all settings back to zero, press the reset button 73. To exit the height, adjust page and return the previous field page the operator will need to press the back button 73 or if left inactive for 30 seconds then it will automatically transition back to the main field page.

E. CSD Page (FIGS. 19 and 19A): Once the CSD button has been pressed, it will take the operator to the CSD page 500. Under the CSD page, the operator will be able to enable, adjust, and obtain feedback on the first two CSD systems, CSD enable 510, CSD disable 510, enable CSD auto target 512, and CSD adjust 514.

CSD Enabled/Activated indicator light 516: This indicator light 516 will turn green when the CSD function has been enabled or turned on. This does not indicate that the CSD fan and agitate motors (if equipped) are running.

CSD Running indicator light 518: This indicator light 518 will turn green when the CSD is actually running. The CSD is commanded by the automation system to run when two conditions have been met. The first being when the bar is being lowered and is within a certain percentage of the target "Dirt" position. Once the bar is within the range, it will now start an On Delay timer, that when this time setting in seconds, has been reached, it will now turn the CSD fan and agitate motors (if equipped) on and will be indicated by the green running light. Both the "within certain percentage of target "Dirt" position setting" and the "On Delay timer time setting, in seconds" are both adjustable by the operator.

CSD Commodity Tanks Low level indication lights 520 for the two tanks. A green light indicates the product level is above the level sensor, and a red light indicates the product is below the level sensor. One sensor is provided per tank.

CSD1 Actual Rate indicators 522: This will display the actual value, either Fan RPM or air pressure for CSD1 (Settable in the machine configuration page).

CSD1 Target Rate Indicators 524: The adjustable value in this box 524 will be the target fan RPM or air pressure for CSD1 if the CSD auto target function 512 is enabled. The adjustable value in this box 524 will be 0-100% of the CSD proportional fan speed control value output for CSD1 if the CSD adjust function 514 is enabled.

CSD2 Actual Rate indicator 526: This box will display the actual value, either fan RPM or air pressure for CSD1 (Settable in the machine configuration page).

CSD2 Target Rate Indicator 528: The adjustable value in this box 528 will be the target fan RPM or air pressure for CSD2 if the CSD auto target function 512 is enabled. The adjustable value in this box 528 will be 0-100% of the CSD proportional fan speed control value output for CSD2 if the CSD adjust function 514 is enabled.

Sweep Page: Once the sweep button 320 has been pressed, it will take the operator to the sweep page 600. On this page the operator can set the sweep in the following modes by pressing the corresponding buttons:

UpForce (602) or adding pressure to lift some of the sweep assembly weight off of the ground.

Down Force (604) or adding pressure to add downward force "more weight" to the sweep assembly.

Hold or manual adjust (606) where it maintains its current state without automatic correction or adjustment.

On this page, the operator can also adjust the "T" target pressure setting by selecting the adjustment box 608. On the sweep version with air compressor, there is a button to enable and disable the compressor. On both versions, sweep control is paused during a lift and lower to reduce unnecessary run time on the compressor.

When the box is selected, an HMI rotary encoder knob icon 610 will appear. This icon 610 indicates that the operator will need to use the rotary nob 72 on the HMI (FIG. 14) to adjust this setting. Rotate clockwise to increase the value, rotate counterclockwise to decrease the value.

To Exit the sweep page 600 and return the previous field page 300 the operator will need to press the Back button 74 or if left inactive for 30 seconds then it will automatically transition back to the main field page.

II. Hydraulic System

The hydraulic system has been designed utilizing the distributed controls concept so that at its core, it is very basic by deploying a bidirectional flow, common supply rail system or common SCVI A and SCVI B supply throughout the entire machine. This allows the automation system to retain the same basic means of interfacing with the operator in the cab that the industry is accustomed to. They can perform the same command operations e.g. raise/lower, fold/unfold etc. with the tractor SCV's with no additional directional controls such as add-on joysticks, switch, levers etc. The common supply rail system or common SCVI A and SCVI B supply throughout the entire machine is also so that no matter where the end actuator or function is physically located, then the addition of those functions will not disrupt the core foundation of the design, in turn reducing the risk of a high impact re-design that may or may not be triggered by performance issues. This is achieved by having the ability to branch off of, or to tee into the common SCVI A and SCVI B supply where needed, This design, since it is very open, has the inherent benefit that if the supply flow, pressure, or the line velocities have been exceeded by the current methods, then it is simple with little impact load addition capacity. Where additional capacity is needed, it can be achieved by means of the same concept used to add additional functions by simply branching into, or to tee into the current supply lines. To add to this basic concept, the primary functional HIC's have been designed and laid out to aid in this common SCVI A and SCVI B plumbing layout. The primary functional HIC's, such as the center section, left wing, and right-wing manifolds are utilized as physical anchor points for the plumbing and are functionally used to "Tee" into the common SCVI A SCVI B supply lines. This concept allows for "modular building blocks" to be developed so that new options can be implemented with minimal impact to the existing system. When this is executed the basic requirements e.g. flow, pressure, and when to operate for those new options are easily identified and incorporated into the core foundation. In this automation system, the control of these functions, hydraulically, can be broken down into several basic groups:

1. Selective Control Function: A selective control function is a function, that when activated by the automation system or by means of physical valve override, hydraulically connects the actuators ports directly to the SCVA and SCVB common supply. Through this type of function, the automation system has no control of the speed or the direction of that actuator but merely selects or enables it. With a selective control function, since the actuator is directly connected to the SCV A and SCV B supply lines, the operator controls the speed and the direction by means of using the tractors lever/joystick for the SCV that is connected to the chosen circuit of the bar.

2. Automated Direction Control Function: An automated directional control function is a function, that when activated by the automation system or by means of physical valve override, hydraulically connects the actuators ports indirectly to the SCVA and SCVB common supply. Through this type of function, the automation system controls the speed and the direction of the actuator relative to the supply capacity and regardless of the supply direction of the SCVA and SCBV common supply.

3. Automated Selective Control Function: An automated selective control function is a function, that when activated by the automation system, based on machine conditions or by means of physical valve override, hydraulically connects the actuators ports directly to the SCVA and SCBV common supply. With this type of function, the automation system does not control of the speed or the direction of that actuator by means of the hydraulic valve but selects or enables it when the supply is active from a specific SCV supply line.

4. SCVI Directional Trigger: The SCVI Directional Trigger is a term that is in reference to how the Automation System identifies what the operators' intent is based on how they manipulate the specific tractor SCV from the cab. This is achieved by monitoring the pressure in both the SCVIA and SCVI B lines and whichever SCVI line has the pressure increasing at the greatest rate is then identified as to be the commanded direction that the operator is trying to achieve. For example, in reference to the Raise/Lower function, if the pressure in SCVI A is rising at a greater rate than the pressure in SCVI B, then that would indicate that the operator is commanding the bar to Lower. Since the automation system is using the greatest rate of pressure increase as an input as a command to start a process, then it must have a way to identify that the operator is commanding it to stop that process. For this, the system is looking for a specific rate of decay of that signaling pressure. This is achieved by allowing both the SCV A and SCV B lines to bleed off residual pressure back to the tank drain line. By allowing the bleed off of this pressure, the automation system can see the specific rate of decay occur when the operator centers the tractor SCV, thus shutting off the supply to the bar and in turn, signaling the automation system to stop that process.

This bleed-off circuit has several inherent benefits:
  a) Since the residual pressure from the SCVI A and SCVI B lines is allowed to bleed off, the operator can disconnect/re-connect the lines without them being under pressure.
  b) The operator can "flush" the SCVI lines of contamination that may have been induced from hook up by turning the SCVI on for several minutes with the HMI at the main Mode page.
  c) In colder applications, such as late fall strip till, the operator can warm the SCVI lines up by turning the SCVI on with the HMI at the main Mode page.

III. Electrical System: The electrical system, like the hydraulic system, has been designed utilizing the same distributed controls concept so that by deploying a standard communication cable throughout the entire machine there is the ability to add external power supply tap cables where needed. Within this communication cable there are two independent CAN communication networks (Can open and J1939) as well as a baseline battery positive and negative supply. As a whole, this system utilizes the two independent CAN networks to interface with all distributed control devices. With the standard communication cable ran throughout the entire machine, it no longer matters where the CAN nodes are physically located, and the addition of those functions will not disrupt the core foundation of the design, in turn reducing the risk of a high impact re-design that may or may not be triggered by performance issues. This is achieved by having the ability to branch off of the network cable where needed. This design, since it is very open, has the inherent benefit that if the power supply has been exceeded, then it is simple to add addition capacity, with little impact. Where additional capacity is needed, it can be achieved by connecting an external power tap harness from the multiplexed remote power distribution hub to the new isolated power branch of the machine network. To add to this basic concept, the primary functional HIC's that are utilized as physical anchor points for the plumbing functionally achieve the same end results as the CAN nodes for each function are installed on the same brackets as their corresponding manifolds. This concept allows for the same "modular building blocks" to be developed so that new options can be implemented with minimal impact to the existing system. When this is executed, the basic requirements (e.g. voltage drop, current, and buss load) for those new options are easily identified and incorporated into the core foundation.

IV. Acronyms:
  A. Automation system: is as a whole or as an individual reference to the electrical and hydraulic systems that are implemented.
  B. HMI: Human Machine Interface, a graphical interface that allows humans and machines to interact.
  C. CAN Bus: Controller Area Network, is a robust vehicle bus standard designed to allow microcontrollers and other devices to communicate with each other in applications without a host computer. It is a message-based protocol, designed originally for multiplex electrical wiring within automobiles to save on harnessing and harnessing complexity.
  D. J1939: A CAN Bus communication protocol governed by the SAE organization and is the vehicle bus recommended practice used for communication and diagnostics among vehicle components.
    1. Related Standards: ISO 11898, ISO 11992, ISO 11783, NMEA 2000.
  E. CANopen: Is a CAN Bus communication protocol and device profile specification for embedded systems used in automation that is governed by CAN in Automation CiA.
  F. CAN Node: A device that has non logical capabilities and used to expand the physical VO layer of an automation system and communicates over the CAN Bus to the master controller.
    1. Aliases: Dumb Node, expansion card, 1/0 Unit
  G. Master: A device that has a processor in which it can launch the automation application, make and execute logical decisions.
    1. Aliases: Computer, Brain Box, Controller
  H. HIC: Hydraulic Integrated Circuit
    1. Aliases: Manifold, Valve block.
  I. DCV: Directional Control Valve
  J. CBV: Counterbalance Valve
    1. Aliases: Motion control valve, load holding valve.
  K. Proportional control: Variable control of a device.
  L. Digital control: On or OFF control only.
  M. SCV: Selective Control Valve.
  N. Process Transmitter: A drive that translates physical process data such as fluid media, gas or liquid and converts it into an electrical or communication value. This physical process data of a fluid media can be, but not limited to pressure, temperature, electrical conductivity etc.
    1. Aliases: Transducer, X-Ducer,
      a) Process data specific:
        (1) Pressure/Transducer, Sensor, Transmitter, Sender.
        (2) Temperature/Transducer, Sensor, Transmitter, Sender.
  O. CSD: Central Seed Delivery—A system that consists of hoppers to hold seed and deliver that seed via fan supplied air pressure to the planter seed meters.

V. High level layout: As a whole, the entire automation platform has been designed using a distribute control concept whereas the control devices, both electrical and hydraulic are placed at the point of use instead of one centralized location. For example, the controls for the left wing wheels are at the left wing wheel unit, the controls for the right wing wheels are at the right wing wheel unit etc. This is done so that only the basic system supply connections are routed and accessible throughout the entire bar, making it easier to install as well as the ability to add functionality and capacity at a later date as the product line evolves. These basic system supply connections comprise of a small CAN Bus trunk harness, external power supply taps of both Electrical and Hydraulic if needed, SCV A, SCV B, and Case Drain lines that run throughout the entire bar. This has several key benefits:
  A. Simplistic in nature: There is minimal wiring and plumbing running through the entire bar because all of the individual electrical and hydraulic connections are made at the point of use instead of placing all of the controls at one centralized point and running the individual electrical and hydraulic connection from that point out to the point of use.
B. Expandable: As the product line evolves to meet market demands, if a new feature is required, then there is minimal impact to connect into the existing automation platform. This is simple to do as the basic supply connections for additional options/new features can be made by the concept of branching off both the hydraulic lines and CAN Bus trunk harness at any given physical location on the bar.
C. Ability to add capacity: Since all of the basic system supply connections are accessible throughout the entire bar, then when electrical and or hydraulic supply capacities have been exceeded on a particular segment of the machine, then the additional functions (new options), can be isolate and supplied via an external power supply tap without a system redesign.

VI. Physical placement of control device groups:
A. Tractor Cab:
1. HMI, CONSOLE COMPUTER
2. CAN Cable
3. Universal Power Adapter
B. Front Assembly (Front Location of Bar):
1. Front Manifold:
a) Tongue
b) Trans Latch
c) Markers
2. VAC Fan 1 & 2 Manifold
3. SCV 1, 2, & 3 Connections
4. Case Drain Connection
5. ISO Cable (ECU & Output Power Circuit)
6. External CAN Connection
C. Center Section Assembly (To the Right of the Right-Wing Draft Tube pivot point):
1. Center Section Manifold:
a) Center Section Wheel/Track Raise/Lower
b) Fold/Un-Fold
c) SCV A & B Psi feedback
2. VAC Fan 3 & 4 Manifold
3. Folding Step Back
4. Multiplexed Remote Power Distribution Hub
D. Right Wing Assembly (Centered between the Right Wing Inner and Right-Wing outer wheel assemblies):
1. Right Wing Raise/Lower
2. Right Wing Height Position Feedback Sensor
E. Left Wing Assembly (Centered between the Left Wing Inner and Left-Wing outer wheel assemblies):
1. Left Wing Raise/Lower
2. Left Wing Height Position Feedback Sensor
F. CSD Assembly (Center frame assembly):
1. CSD Enable
2. CSD Proportional Fan Speed Control
3. CSD Commodity Tanks Desecrate Level
4. CSD Plenum Air Pressure
5. CSD Agitate Speed Control
6. CSD Power Beyond with flow control
7. CSD CASE Drain Pressure Feedback (Option)
8. CSD Commodity Tanks Analog Level (Option)
9. CSD Commodity Tanks Hydraulic Scale (Option)
G. Bar Unpacked (UNFOLDED)/Marker Enable Discrete Sensor
H. Center Section Height Position Feedback Sensor
I. Drawbar:
1. Drawbar Assembly
a) Drawbar Raise/Lower
b) Drawbar Height Position Sensor
c) Drawbar DOT Light Connection

What is claimed is:

1. An agricultural toolbar comprising:
a frame including a center section and wings on opposite ends of the center section;
wheels on the frame for supporting the frame above the ground;
a position sensor associated with the wheels;
a hydraulic system for adjusting a position of the frame relative to the wheels based upon an output from the position sensor, wherein the hydraulic system comprises non-rephase cylinders and a rail that supplies oil to all of the non-rephase cylinders on the frame; and
a pressure sensor to determine oil flow direction in the hydraulic system.

2. The toolbar of claim 1, further comprising a scale feature whereby a wheel position sensed by the position sensor and a hydraulic pressure are used to determine payload weight.

3. The toolbar of claim 1, further comprising a control system and a human machine interface (HMI) in communication with the control system.

4. The toolbar of claim 3, wherein the control system allows an operator to apply downforce to the frame either manually or automatically whereby wheels, actuators, and ground position and force feedback are used to control the re-distribution of bar weight from the HMI.

5. The toolbar of claim 3, wherein the control system is adapted to automatically control a drawbar position so that the drawbar can synchronously travel with the toolbar during the raise/lower sequence in order to maintain a consistent position relative to the toolbar position.

6. The toolbar of claim 3, wherein the control system is adapted to provide and control excess hydraulic flow to allow an operator to power an ancillary piece of equipment.

7. The toolbar of claim 6, wherein the operator controls the hydraulic flow manually at a manifold.

8. The toolbar of claim 6, wherein the hydraulic flow is controlled electronically through the HMI.

9. The toolbar of claim 3, wherein the control system is adapted to permit automatic adjustment of the tool bar between a lowered work position and a raised travel position upon touch of single control.

10. The toolbar of claim 3, wherein the control system is adapted to permit the operator to manually and automatically control the height of the sections in relation to the ground.

11. The toolbar of claim 3, further comprising parallel arms, wherein the control system is adapted to read the position of parallel arms in relation to the sections and manually or automatically make adjustments to frame.

12. The toolbar of claim 3, wherein the control system is adapted to monitor a case drain pressure and alert an operator if the drain pressure is out of a normal range.

13. The toolbar of claim 1 wherein the hydraulic system includes a main valve block having galleys, and the pressure sensor being operatively connected to at least one of the galleys to determine the oil flow direction.

14. The agricultural tool bar of claim 1 wherein the hydraulic system raises and lowers the wheels independently of one another.

15. A method of raising and lowering a wing on an agricultural tool bar having wheels, comprising:
  providing oil flow through non-rephase cylinders in a hydraulic system connected to the wing to raise and lower the wing; and
  determining oil flow direction through the hydraulic system to maintain accurate operating height of the wing by controlling the raising and lowering of the wing.

16. The method of claim 15 further comprising actuating the hydraulic system in response to a signal from a position sensor associated with the wing.

17. The method of claim 15 wherein the oil is provided to the cylinders via a common rail.

18. The method of claim 15 determining payload weight on the tool bar by sensing a position of a wheel supporting the wing and sensing a hydraulic pressure of the oil.

19. The method of claim 15 further comprising controlling a position of the wing with a human machine interface (HMI) in communication with a control system operatively connected to the cylinders.

20. The method of claim 15 wherein each wing is supported by a wheel with adjustable height, and the hydraulic system adjusts the height of each wheel independently from the other wheels.

* * * * *